US009749280B2

(12) United States Patent
Carr et al.

(10) Patent No.: US 9,749,280 B2
(45) Date of Patent: Aug. 29, 2017

(54) TECHNIQUES FOR RELIABLE MESSAGING FOR AN INTERMEDIARY IN A NETWORK COMMUNICATION ENVIRONMENT

(71) Applicant: Oracle International Corporation, Redwood Shores, CA (US)

(72) Inventors: Harold Carr, Salt Lake City, UT (US); Mitchell Upton, Highlands Ranch, CO (US); Uday Madhusudan Joshi, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 286 days.

(21) Appl. No.: 14/325,834

(22) Filed: Jul. 8, 2014

(65) Prior Publication Data
US 2015/0088999 A1 Mar. 26, 2015

Related U.S. Application Data

(60) Provisional application No. 61/880,819, filed on Sep. 20, 2013, provisional application No. 62/002,635, (Continued)

(51) Int. Cl.
*H04L 12/58* (2006.01)
*H04L 29/08* (2006.01)

(52) U.S. Cl.
CPC ............. *H04L 51/30* (2013.01); *H04L 67/02* (2013.01); *H04L 67/146* (2013.01); *H04L 67/2871* (2013.01)

(58) Field of Classification Search
CPC ....... H04L 51/30; H04L 67/02; H04L 67/146; H04L 67/2871
(Continued)

(56) References Cited

U.S. PATENT DOCUMENTS 6,615,383 B1 * 9/2003 Talluri .................. H04L 1/1614
714/749
6,993,582 B2 * 1/2006 Holden ................... G06F 21/31
709/217
(Continued)

FOREIGN PATENT DOCUMENTS

CN 105637843 6/2016
EP 1670196 A2 6/2006
(Continued)

OTHER PUBLICATIONS

"Web Services Reliable Messaging (WS-1 Reliable Messaging) Version 1.1," Jun. 14, 2007, [online], retrieved from the internet, [retrieved on Sep. 18, 2014], <URL: http://docs.oasis-opert.org/ws-rx/wsrm/200702/wsrm-1.1-spec-os-01.pdf>, pp. 1-62.
(Continued)

*Primary Examiner* — Nicholas Taylor
*Assistant Examiner* — Chong G Kim
(74) *Attorney, Agent, or Firm* — Kilpatrick Townsend and Stockton LLP

(57) ABSTRACT

The present disclosure relates generally to techniques for improving reliability of message communications. In certain embodiments, techniques are described for facilitating reliable communication of messages between a source (e.g., a client system) and a destination (e.g., a target system) via an intermediary communication handler system. In certain embodiments, a message can include a request to be communicated to a destination for a target service. An intermediary communication handler system can store information indicative of the delivery status for a message to ensure reliable communication. The information indicative of the delivery status for a message can be managed in association with a unique identifier corresponding to the message. The information indicative of the delivery status for a message may also be used to determine whether to retry communi-
(Continued)

cation of a message in satisfaction of reliability parameters (e.g., QoS criteria) specified for a communication protocol used for communication of the message.

19 Claims, 7 Drawing Sheets

Related U.S. Application Data filed on May 23, 2014, provisional application No. 62/017,068, filed on Jun. 25, 2014.

(58) Field of Classification Search
USPC .......................................... 709/206
See application file for complete search history.

(56) References Cited

U.S. PATENT DOCUMENTS

| | | | | |
|---|---|---|---|---|
| 7,356,529 | B1* | 4/2008 | Ennis | G06Q 10/10 370/396 |
| 8,144,714 | B1* | 3/2012 | Buchko | H04L 12/5875 370/229 |
| 8,484,370 | B1* | 7/2013 | Coffee | H04L 69/163 709/228 |
| 8,761,181 | B1* | 6/2014 | Gostev | H04L 1/1614 370/393 |
| 9,197,428 | B1* | 11/2015 | Lebedev | G06Q 40/04 |
| 2002/0152299 | A1* | 10/2002 | Traversat | G06F 9/4416 709/223 |
| 2004/0205770 | A1* | 10/2004 | Zhang | G06F 9/546 719/313 |
| 2004/0205781 | A1* | 10/2004 | Hill | G06F 9/546 719/328 |
| 2006/0031431 | A1 | 2/2006 | Patrick et al. | |
| 2006/0075133 | A1* | 4/2006 | Kakivaya | H04L 1/1848 709/237 |
| 2006/0129650 | A1* | 6/2006 | Ho | H04L 67/2804 709/207 |
| 2006/0168132 | A1* | 7/2006 | Bunter | G06F 9/547 709/219 |
| 2007/0043827 | A1* | 2/2007 | Banerjee | H04L 67/02 709/218 |
| 2007/0300235 | A1* | 12/2007 | Dekel | H04L 69/326 719/313 |
| 2009/0228602 | A1* | 9/2009 | Speight | H04L 1/18 709/236 |
| 2009/0328060 | A1 | 12/2009 | Bhumana et al. | |
| 2010/0138508 | A1* | 6/2010 | Hoffmann | H04L 67/02 709/206 |
| 2010/0192025 | A1* | 7/2010 | Limprecht | G06F 9/546 714/48 |
| 2010/0241729 | A1* | 9/2010 | Angelov | G06F 9/546 709/217 |
| 2010/0274857 | A1* | 10/2010 | Garza | G06F 11/08 709/206 |
| 2011/0113435 | A1* | 5/2011 | Angelov | G06F 17/30893 719/313 |
| 2011/0161349 | A1* | 6/2011 | Ireland | G06F 17/30575 707/769 |
| 2013/0346140 | A1* | 12/2013 | Balko | G06F 9/5055 705/7.26 |
| 2014/0032690 | A1* | 1/2014 | Ramarao | G06F 9/546 709/206 |

FOREIGN PATENT DOCUMENTS

| | | |
|---|---|---|
| EP | 3047630 | 7/2016 |
| JP | 2016533546 A | 10/2016 |
| WO | 2015041740 | 3/2015 |

OTHER PUBLICATIONS

International Search Report and Written Opinion mailed Sep. 26, 2014 in PCT/US2014/045813, 12 pages.
"Introducing Oracle Infrastructure Web Services," Oracle Fusion Middleware Developer's Guide for Oracle Infrastructure Web Services 11g Release 1 (11.1.1.6), [online], 2009, [retrieved on Sep. 10, 2014], retrieved from the internet: <URL: http://docs.oracle.com/cd/E23943_01/web.1111/e15184/intro.htm#sthref8>, 5 pages.
Guo, Jiandong, "Introduction to Oracle Web Services and Web Services Manager," Oracle Blog, [online], Jul. 31, 2011, [retrieved on Sep. 10, 2014], retrieved from the internet: <URL: https://blogs.orade.com/wssi/entry/introduction_to_oracle_web_services>, 6 pages.
"Programming Advanced Features of WebLogic Web Services Using JAX-RPC," Oracle Product Documentation, [online], 2014, [retrieved on Sep. 10, 2014], retrieved from the internet: <URL: http://docs.oracle.com/cd/E15051_01/wls/docs103/webserv_adv_rpc/>, 6 pages.
Rohlin, Alexis, "The Definition of Web Service EndPoint," eHow, [online], [retrieved on Sep. 10, 2014], retrieved from the internet: <URL: http://www.ehow.com/info_12212371_definition-service-endpoint.html>, 2 pages.
Schmutz, Guido, "Where and when to use the Oracle Service Bus (OSB)," Slideshare.net, [online], UKOUG Conference 2012, [retrieved on Sep. 11, 2014], retrieved from the internet: <URL: http://www.slideshare.net/gschmutz/where-andwhentousetheoracleservicebusv2>, 7 pages.
Bilorusets, Rusian, et al., "Web Services Reliable Messaging Protocol (WS—ReliableMessaging)," Feb. 2005, [online], [retrieved on Sep. 11, 2014], retrieved from the internet: <URL : http://specs.xmlsoap.org/ws/2005/02/rm/ws-reliablemessaging.pdf>, 37 pages.
"31 JMS Transport," Oracle Fusion Middleware Developer's Guide for Oracle Infrastructure Web Services llg Release 1 (11.1.1.5.0), [online], 2008, [retrieved on Sep. 10, 2014], retrieved from the internet: <http://docs.oracle.com/cd/E21764_01/doc.1111/e15866/jms.htm#11051973>, 12 pages.
"3 Oracle Fusion Middleware Components," Oracle Fusion Middleware Concepts Guide 11g Release 1 (11.1.1), [online], 2009, [retrieved on Sep. 10, 2014], retrieved from the internet: <URL: http://docs.oracle.com/cd/E15523_01/core.1111/e10103/components.htm#BABBBADF>, 22 pages.
"5 Using Web Service Reliable Messaging," Oracle Fusion Middleware Programming Advanced Features of JAX-WS Web Services for Oracle WebLogic Server 11g Release 1 (10.3.5), [online], 2007, [retrieved on Sep. 10, 2014], retrieved from the internet: <URL: http://docs.oracle.com/cd/E21764_01/web.1111/e13734/rm.htm#autoId9>, 36 pages.
"Enterprise-Scale API Security & Manage," Product Sheet, Layer 7 Technologies, [online], [retrieved on Sep. 10, 2014], retrieved from the internet: <URL: http://www.layer7tech.com/>, 2 pages.
"Vordel Products," Product Sheet, Axway, [online], [retrieved on Sep. 10, 2014], retrieved from the internet: <URL: http://www.axway.com/vordel-products>, 1 page.
"11 Publishing and Finding Web Services Using UDDI," Oracle Fusion Middleware Programming Advanced Features of JAX-WS Web Services for Oracle WebLogic Server 11g Release 1 (10.3.5), [online], 2007, [retrieved on Sep. 10, 2014], retrieved from the internet: <URL: http://docs.oracle.com/cd/E21764_01/web.1111/e13735/uddi.htm>, 12 pages.
"Oracle Service Bus," Oracle Data Sheet, Oracle Fusion Middleware, 2013, Oracle.com, 4 pages.
"Maximize the Benefits of Oracle SOA Suite 11g with Oracle Service Bus," Oracle White Paper, Oracle Fusion Middleware, Oct. 2013, 17 pages.
PCT/US2014/045813, "Written Opinion", Sep. 24, 2015, 8 pages.
PCT/US2014/045813, "International Preliminary Report", Dec. 4, 2015, 31 pages.

* cited by examiner

US 9,749,280 B2

TECHNIQUES FOR RELIABLE MESSAGING FOR AN INTERMEDIARY IN A NETWORK COMMUNICATION ENVIRONMENT

CROSS-REFERENCES TO RELATED APPLICATIONS

The present application claims priority and benefit from:
(1) U.S. Provisional Application No. 61/880,819, filed Sep. 20, 2013, entitled "SYSTEM FOR RELIABLE MESSAGING FOR AN INTERMEDIARY IN A WEB SERVICE ENVIRONMENT";
(2) U.S. Provisional Application No. 62/002,635, filed May 23, 2014, entitled "TECHNIQUES FOR RELIABLE MESSAGING FOR AN INTERMEDIARY IN A NETWORK COMMUNICATION ENVIRONMENT"; and
(3) U.S. Provisional Application No. 62/017,068, filed Jun. 25, 2014, entitled "TECHNIQUES FOR RELIABLE MESSAGING FOR AN INTERMEDIARY IN A NETWORK COMMUNICATION ENVIRONMENT."
The entire contents of each of the above-identified provisional patent applications are incorporated herein by reference for all purposes.

TECHNICAL FIELD

The present disclosure relates generally to managing network communication and more specifically to various techniques for improving reliability of network communication.

BACKGROUND OF THE INVENTION

A network communication system enables communication of electronic messages between two electronic devices via a network (e.g., the Internet). Such a communication system may utilize a protocol stack supporting networking protocols and other protocols that can be used to define, locate, implement, and/or enable devices to interact with each other. Messages may be communicated via a network communication system using a variety of protocols to facilitate communication between two electronic devices.

During an exchange of messages between a source (e.g., a client device) and a destination (e.g., a target service), for a message communicated from the source to the destination, the source may attempt to determine whether an acknowledgement has been received for the message. If such an acknowledgement has not been received or if the source determines that the message is deemed lost, the source may consider retransmitting the message to the destination. Subsequent transmissions to redeliver the message may be hindered by the communication protocol used for transmitting the messages. Further, over-aggressive retransmissions of messages can cause the network communication system to be flooded with duplicate messages further impeding the delivery of the messages. Additionally, transmitting duplicate messages may cause a disproportionate amount of computing and memory resources of the network communication system to be consumed; far more than desired for communication of an original message.

BRIEF SUMMARY

The present disclosure relates generally to techniques for improving reliability of message communications. In certain embodiments, techniques are described for facilitating reliable communication of messages between a source (e.g., a client system) and a destination (e.g., a target system) via an intermediary communication handler system. The messages may be communicated to request a target service from the destination.

In certain embodiments, an intermediary communication handler system can store information indicative of the delivery status for a message to ensure reliable communication. In certain embodiments, the intermediary communication handler system may use the information indicative of the delivery status for a message to ensure reliable delivery consistent with QoS criteria.

In certain embodiments, the information indicative of the delivery status for a message may enable the intermediary communication handler system to determine when and what actions to perform (e.g., re-sending messages and communicating results of delivery) in the event of delays and/or errors encountered with delivering of a messaging to a destination. For example, the intermediary communication handler system may determine whether to permit duplicate messages corresponding to a request (e.g., a request for a network service) to be sent to a destination based upon a delivery status of previous messages corresponding to the same request that were sent to the destination. By maintaining delivery status, the intermediary communication handler can handle delivery of messages reliably. The intermediary communication handler can use the delivery status to prevent duplicate attempts to deliver a message. In doing so, the intermediary communication handler may avoid having to manage redeliver a message. A burden can shift to the source to determine whether to retry delivery. The information indicative of the delivery status for a message can be managed in association with a unique identifier. The unique identifier can be based on a digital signature of a message or a message identifier associated with the destination. In certain embodiments, the unique identifier can be associated with a message identifier corresponding to the message. By associating the message identifier with the unique identifier, the intermediary communication handler can determine and prevent subsequent requests to deliver an identical message having the message identifier associated with the message. The information indicative of the delivery status for a message may also be used by the intermediary communication handler system to determine whether to retry communication of a message in satisfaction of reliability parameters (e.g., QoS criteria) specified for a communication protocol used for communication of the message.

In some embodiments, the intermediary communication handler system can provide one or more callable interfaces that enable the intermediary communication handler system to receive acknowledgement when a message has been delivered. The one or more callable interfaces may enable the intermediary communication handler system to receive notification of changes in a status of messages. The interface communication handler system may reduce a burden on an intermediary service system (e.g., an enterprise service bus) by managing information related to communication of messages between the source and the destination. Further, the intermediary communication handler may promote independence between the source and the destination to enable each component to operate independently irrespective of limitations or differences in the communication environment and/or protocols.

In certain embodiments, one or more techniques are provided for facilitating reliable communication of messages from a source to a destination. One such technique can be a method, which can be performed by a computing system such as including an intermediary communication handler system. The computing system can receive, from a source, a message to send to a target service. The computing system can determine a message identifier associated with the message. The computing system can determine, based on the message identifier, that the message had previously been sent to the target service. In some embodiments, the existence of a message identifier can indicate that a duplicate message was previously sent to the target service. The computing system may determine whether the message identifier is stored in a data store. Determining that the message identifier is associated with an identifier stored in the data store may indicate that the message has previously been sent to the target service. The computing system may prevent the message from being sent to the target service so as to prevent duplicate messages from being sent to the target service. Upon determining that the message had not previously been sent, the computing system can store the message identifier for the message. Further, the computing system may perform one or more actions related to delivery of the message in response to determining that the message had not previously been sent to the target service. The one or more actions can include sending the message to the target service onbehalf of the source. The computing system can determine whether the message has been delivered to the target service. For example, the computing system can examine the delivery status of the message to determine whether an acknowledgement has been received. Upon determining that an acknowledgement has not been received, the computing system can perform one or more actions related to delivery of the message. Such actions may include sending the message to the target service. The message may be redelivered to the target service with information indicating the sequence number and the identifier of the message originally sent. Upon determining that an acknowledge has been received, the computing system can store a delivery status of the message in association with the message identifier and subsequently notify the source about the delivery status of the message. The computing system can prevent the message from being redelivered to the target service.

In some embodiments, upon determining that the message identifier is not associated with an identifier, the computing system may generate an identifier to be associated with the message identifier of the message. The identifier may be stored in a data store accessible to the computing system. The computing system may determine a sequence number and an identifier of the message using a format of the message. The format may be based on a communication protocol. The identifier associated with the message may be generated based on the sequence number and the identifier of the message.

In some embodiments, a message to be sent to a target service may have a format corresponding to a Web Services-Reliable Messaging (WS-RM) protocol.

In the techniques described above, the computing system may receive, via a delivery status interface, from an intermediary service system, information indicating that the message has been delivered to the target service. Such information may be used to update the delivery status of the message indicating that the message has been delivered to the target service. The computing system may send, to the source, the information indicating that that the message has been delivered to the target service.

In some embodiments, the computing system described above may associated the message with the message identifier upon determining that the message has not been previously sent to the target service. The computing system may then send the message to the target service.

According to at least one example, an apparatus may be provided for facilitating reliable communication of messages from a source to a destination. The apparatus may comprise: means for receiving, by a computing system, from a source, a message to send to a target service; means for determining, by the computing system, a message identifier associated with the message; means for determining, by the computing system, based upon the message identifier, that the message has previously been sent to the target service; means for determining, by the computing system, whether the message has been delivered to the target service; means for preventing, by the computing system, delivery of the message to the target service upon determining that the message has been delivered to the target service; and means for performing one or more actions related to delivery of the message to the target service upon determining that the message has not been delivered to the target service. In one aspect, the message has a format corresponding to a Web Services-Reliable Messaging (WS-RM) protocol. In one aspect, the apparatus may further comprise means for determining whether the message identifier is associated with an identifier stored in a data store, wherein determining that the message identifier is associated with an identifier stored in the data store indicates that the message has previously been sent to the target service. In one aspect, the apparatus may further comprise: upon determining that the message identifier is not associated with an identifier: means for generating an identifier to be associated with the message identifier, wherein the identifier is generated based on information from the message; and means for storing the identifier in the data store. In one aspect, the apparatus may further comprise means for determining a sequence number and an identifier of the message using a format of the message, wherein the format is based on a communication protocol, and wherein the identifier associated with the message is generated based on the sequence number and the identifier of the message. In one aspect, performing an action related to delivery of the message includes sending the message to the target service. In one aspect, the message is redelivered to the target service with information indicating the sequence number and the identifier of the message. In one aspect, the apparatus further comprises: means for receiving, via a delivery status interface, from an intermediary service system, information indicating that the message has been delivered to the target service; means for updating the delivery status of the message using the information indicating that the message has been delivered to the target service; and means for sending, to the source, the information indicating that that the message has been delivered to the target service. In one aspect, the apparatus further comprises means for sending the message to the target service upon determining that the message has not previously been sent to the target service.

The following detailed description together with the accompanying drawings will provide a better understanding of the nature and advantages of embodiments of the present invention.

BRIEF DESCRIPTION OF THE DRAWINGS

Like reference numbers and designations in the various drawings indicate like elements.

DETAILED DESCRIPTION

Figure 1:
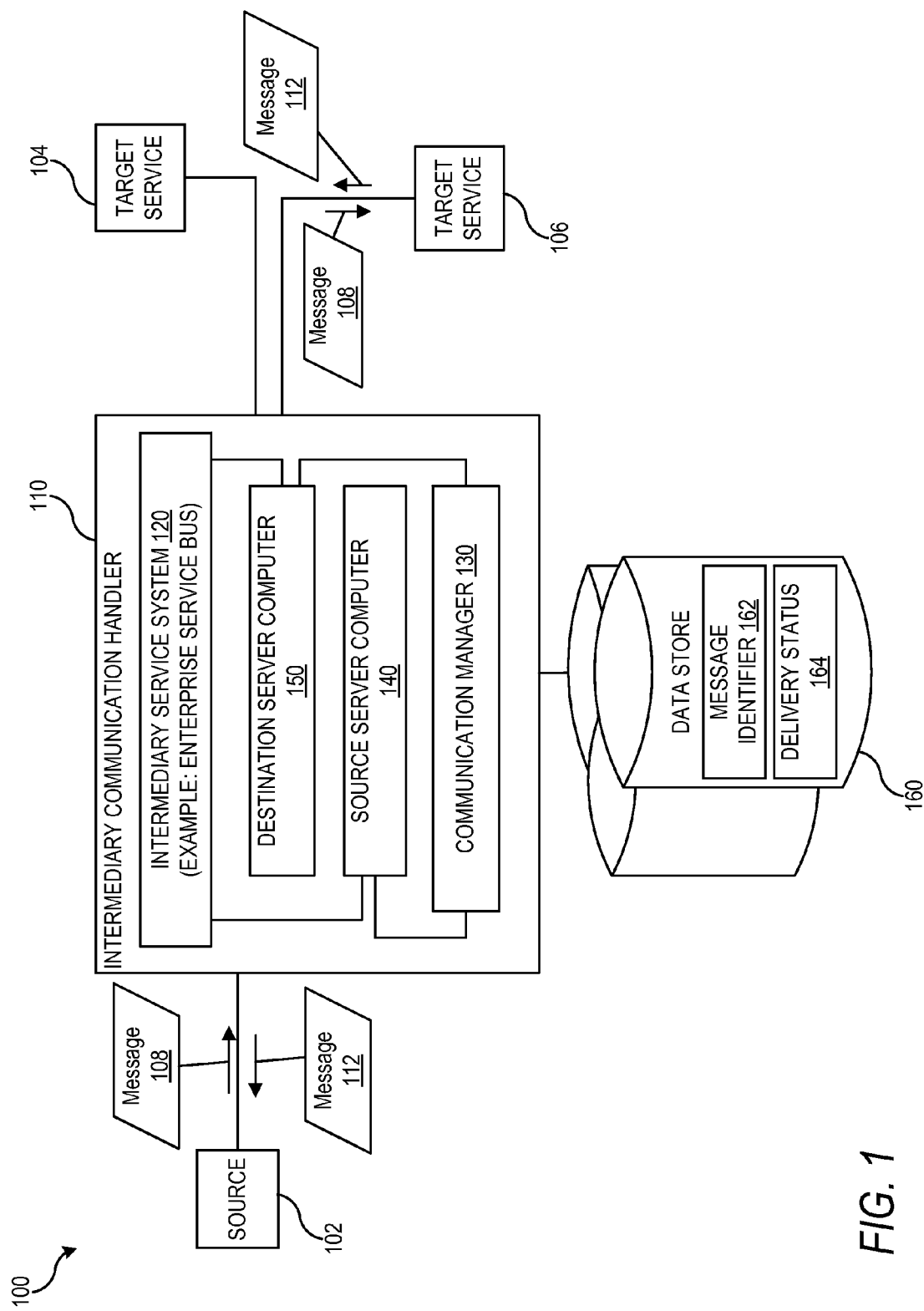
FIG. 1 shows a communication system according to an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

The present disclosure relates generally to techniques for improving reliability of message communications. In certain embodiments, techniques are described for facilitating reliable communication of messages between a source (e.g., a client system) and a destination (e.g., a target system) via an intermediary communication handler system. The messages may be communicated to request a target service from the destination.

In certain embodiments, an intermediary communication handler system can store information indicative of the delivery status for a message to ensure reliable communication. In certain embodiments, the intermediary communication handler system may use the information indicative of the delivery status for a message to ensure reliable delivery consistent with QoS criteria.

In certain embodiments, the information indicative of the delivery status for a message may enable the intermediary communication handler system to determine when and what actions to perform (e.g., re-sending messages and communicating results of delivery) in the event of delays and/or errors encountered with delivering of a messaging to a destination. For example, the intermediary communication handler system may determine whether to permit duplicate messages corresponding to a request (e.g., a request for a network service) to be sent to a destination based upon a delivery status of previous messages corresponding to the same request that were sent to the destination. By maintaining delivery status, the intermediary communication handler can handle delivery of messages reliably. The intermediary communication handler can use the delivery status to prevent duplicate attempts to deliver a message. In doing so, the intermediary communication handler may avoid having to manage redeliver a message. A burden can shift to the source to determine whether to retry delivery. The information indicative of the delivery status for a message can be managed in association with a unique identifier. The unique identifier can be based on a digital signature of a message or a message identifier associated with the destination. In certain embodiments, the unique identifier can be associated with a message identifier corresponding to the message. By associating the message identifier with the unique identifier, the intermediary communication handler can determine and prevent subsequent requests to deliver an identical message having the message identifier associated with the message. The information indicative of the delivery status for a message may also be used by the intermediary communication handler system to determine whether to retry communication of a message in satisfaction of reliability parameters (e.g., QoS criteria) specified for a communication protocol used for communication of the message.

In some embodiments, the intermediary communication handler system can provide one or more callable interfaces that enable the intermediary communication handler system to receive acknowledgement when a message has been delivered. The one or more callable interfaces may enable the intermediary communication handler system to receive notification of changes in a status of messages. The interface communication handler system may reduce a burden on an intermediary service system (e.g., an enterprise service bus) by managing information related to communication of messages between the source and the destination. Further, the intermediary communication handler may promote independence between the source and the destination to enable each component to operate independently irrespective of limitations or differences in the communication environment and/or protocols.

FIG. 1 shows a communication system 100 according to an embodiment of the present invention. As depicted, the communication system 100 includes a source 102, multiple target services (e.g., a target service 104 and a target service 106), and an intermediary communication handler 110. Intermediary communication handler 110 facilitates reliable communication of messages (e.g., a message 108) between the source 102 and one or more destinations. Each target service (e.g., the target service 104 and the target service 106) may be a destination. The communication system 100 shown in FIG. 1 also includes one or more data stores 160 that are accessibly by the intermediary communication handler 110. The data store 160 can be implemented using a database (e.g., a document database, a relational database, or other type of database), a file store, a combination thereof, or some other information store.

It should be appreciated that various different system configurations are possible, which may be different from the communication system 100. The embodiment shown in FIG. 1 is thus one example of a communication system for implementing an embodiment of the invention and is not intended to be limiting. For purposes of illustration, specific embodiments are described herein as techniques for facilitating reliable communication of messages between the source 102 and the target services 104, 106. In accordance with embodiments of the present invention, any source (e.g., the source 102) can communicate with a target service (e.g., the target service 104 or the target service 106) via the intermediary communication handler 110.

The source 102, the intermediary communication handler 110, and the target services 104, 106 can be implemented in different computing systems. In certain embodiments, all or some of the elements of the communication system 100 can be included in a single computing system. When implemented on different computing systems, the source 102, the intermediary communication handler 110, and the target services 104, 106 may communicate with each other via one or more networks (not shown). Examples of communication networks may include the Internet, a mobile network, a wireless network, a cellular network, a local area network (LAN), a wide area network (WAN), other communication networks, or combinations thereof.

The source 102 (e.g., "a source") may include a computing system. The source 102 may be implemented in hardware, firmware, software, or combinations thereof. The source 102 may communicate messages (e.g., the message 108) to the intermediary communication handler 110 for delivery to one or more of the target services 104, 106. In some embodiments, a message sent to a target service may include a request for a service. The source 102 may include a personal digital assistant (PDA), a tablet computer, a laptop computer, a desktop computer, a wearable computer, a pager, etc. The source 102 can include one or more memory storage devices and one or more processors. A memory storage device can be accessible to the processor(s) and can include instructions stored thereon which, when executed by the processor(s), cause the processor(s) to implement one or more operations disclosed herein. In various embodiments, the source 102 may be configured to execute and operate applications such as a web browser, proprietary client applications, or the like.

A target service (e.g., the target service 104 and the target service 106) may be implemented or included in a computing system. A target service may be implemented in hardware, firmware, software, or combinations thereof. A target service may communicate with the source 102 via the intermediary communication handler 110. For example, messages (e.g., message 108) created at the source 102 may identify one or more of the target services 104, 106 as destinations of the messages. A target service, which is the destination for a message, may receive the message 108 sent from the source 102 via the intermediary communication handler 110 and may communicate one or more responses (e.g., a message 112) to the client resource 102. The message 108 may indicate a target service that is being requested. In some embodiments, one or more of the messages 108, 112 can be a web message intended for communication between two electronic devices via the Internet.

A target service can provide a variety of services in response to receiving messages requesting a service. The services may include executing an application, performing a function, retrieving of data, communicating information, or the like.

The target services 104, 106 may be implemented in a computing device, such as a PDA, a tablet computer, a laptop computer, a desktop computer, a wearable computer, a pager, etc. The target services 104, 106 can be implemented using one or more memory storage devices and one or more processors. A memory storage device can be accessible to the processor(s) and can include instructions stored thereon which, when executed by the processor(s), cause the processor(s) to implement one or more operations disclosed herein. In various embodiments, the target services 104, 106 may be configured to execute and operate applications (e.g., a web browser, proprietary client applications, or the like) to provide a service.

In some embodiments, a message (e.g., the message 108) communicated to the target service 104 may be generated by an application executed at the source 102. For example, an application executing at the source may send the message 108 to the target service 106, via the intermediary communication handler 110, for operation of the application, such as a request to perform an action using the target service 106. For example, the source 102 can be a loan application, which communicates a message 108 to request a service from the target service 106 to locate a customer's credit rating. In another example, the client application can be a web browser that communicates a message 108 using a simple object access protocol (SOAP) to request a resource provided by the target service 106. In some embodiments, the source 102 executes an application that communicates the message 108 to a target service, which is executing a different application. In some embodiments, both applications may use web services reliable messaging (WS-RM) protocol for the communications.

The intermediary communication handler 110 can act as a communication proxy service between the source 102 and the target services 104, 106. Rather than communicating directly with the target services 104, 106 to deliver messages (e.g., the message 108), the source 102 may communicate messages to the intermediary communication handler 110 for delivery of the messages to the target services 104, 106. The intermediary communication handler 110 can receive messages (e.g., the messages 108) from the source 102 to be communicated to one or more of target services 104, 106. The intermediary communication handler 110 can receive one or more messages (e.g., the message 112) from a target service (e.g., the target service 106) to be communicated to the source 102. A message (e.g., message 112) received by intermediary communication handler 110 from the target service 106 may be in response to a (e.g., message 108) received by intermediary communication handler 110 from the source 102 and communicated to target service 106. For example, a message 112 received from a target service may include information indicative of the delivery status of message 108 to the target service, such as whether message 108 was received or not received by the target service. As another example, message 112 may include information related to a service requested in message 108.

By communicating via the intermediary communication handler 110, the source 102 and the target services 104, 106 are able to ascertain reliable information regarding delivery status of a message (e.g., the message 108) from a source to a destination. The intermediary communication handler 110 may provide the source 102 and the target services 104, 106 with information indicating a delivery status of communicated messages. The intermediary communication handler 110 may enable reliable delivery of messages where the communication protocol(s) used by the source 102 or the target services 104, 106 may not provide mechanisms for ensuring delivery of messages, transmissions, acknowledgements, etc.

The intermediary communication handler 110 may be implemented using one or more computing devices, such as a server computer. In some embodiments, the intermediary communication handler 110 can include multiple server computers, such as a source server computer 140 and a destination server computer 150. In certain embodiments, one or both of the source server computer 140 or the destination server computer 150 can be a network communication server computer. The source server computer 140 may be configured to process messages received from the source 102 to send to a target service. Messages (e.g., the message 108) may be processed according to a protocol supported by the source 102. The destination server computer 150 may handle delivery of messages processed by the source server computer. The destination server computer 150 may be configured to deliver messages to a destination, such as one of the target services 104, 106. In some embodiments, one or both of the source server computer 140 or the destination server computer 150 can operate as an application server that enables applications and services to be provided to one or both of the source 102 and the target services 104, 106.

The intermediary communication handler 110 can include one or more memory storage devices and one or more processors. A memory storage device can be accessible to the processor(s) and can include instructions stored thereon which, when executed by the processor(s), cause the processor(s) to implement one or more operations disclosed herein. In various embodiments, the intermediary communication handler 110 may be configured to execute and operate a service application such as a web browser, proprietary client applications, or the like.

In some embodiments, exchange of messages (e.g., the message 108) between the source 102 and the target services 104, 106 may be facilitated by one or more of the server computers 140, 150. For example, when a message is communicated from the source 104 to the target service 106 using the WS-RM protocol, the source server computer 140 may be configured to operate as a reliable messaging source (RMS) and the destination server computer 150 may be configured to operate as reliable messaging destination (RMD) to facilitate the exchange of the message 108 according to the WS-RM protocol. The source server computer 140 can communicate with the destination server computer 150 to manage communication of messages. Managing communication of messages may include maintaining a sequence of communication for messages to be delivered. In one embodiment, QoS parameters may be defined (e.g., defined by the protocol itself, defined by a system administrator, etc.) for the message delivery. In such an embodiment, the source server computer 140 and the destination server computer 150 may be configured to ensure delivery of messages according to and in compliance with the QoS parameters of the message communication protocol (e.g., WS-RM protocol).

In some embodiments, the intermediary communication handler 110 can include an intermediary service system 120 to facilitate the exchange of messages between the source 102 and one or more target services 104, 106. For example, the intermediary service system 120 can include or implement an enterprise service bus. One or more disparate computing systems, such as the source 102 and the target services 104, 106, can be communicatively connected through the intermediary service system 120. The intermediary service system 120 can monitor and control routing of messages between the source 102 and the target services 104, 106. The intermediary service system 120 can control access to the target services 104, 106 including contention resolution between multiple sources for communication with a target service. The intermediary service system 120 can perform event handling, data transformation for messages being communicated, and message protocol conversion.

The intermediary service system 120 can support a variety of different communication protocols among others including SOAP, Hypertext Transfer Protocol (HTTP), Java Messaging Service (JMS) protocols, Java Remote Method Invocation interface over the Internet Inter-Orb Protocol (RMI-IIOP), electronic mail communication protocols (e.g., Simple Mail Transfer Protocol), File Transfer Protocol (FTP), WS-RM protocol, any of which can be implemented by the source 102 and/or the target services 104, 106 for communication. In certain embodiments, for a message originated at a source and destined for a particular target, the communication protocol used for communications between the source and intermediary communication handler 110 may be different from the communication protocol used for communications between intermediary communication handler 110 and the particular target. In such a scenario, a message 108 received by intermediary communication handler 110 from a source 102 for delivery to a destination, such as the target services 104, 106, may be received by intermediary communication handler 110 in a first format according to a first communication protocol. Intermediary communication handler 110 may then convert the received message to a second format that is different from the first format and communicate the converted message to the intended destination according to a second communication protocol supported by the destination, where the second communication protocol is different from the first communication protocol.

The intermediary communication handler 110 can include a communication manager 130 that is configured to manage status of communication between the source 102 and one or more of the target services 104, 106. In one embodiment, for each distinct message (e.g., the message 108 or the message 112) communicated via the intermediary communication handler 110, information may be stored in one or more data stores (e.g., the data store 160) related to the message. The stored information may include a unique message identifier 162 for each unique message or other information about the state of the message. The message identifier of a message may be used as the unique message identifier 162 or may be associated with another identifier used as the unique identifier 162. By storing the message identifier of the message, the intermediary communication handler 110 can determine whether any new messages are duplicates of messages that are pending delivery. Duplicate messages may have a message identifier that is identical to a previous message. The message identifier of incoming messages may be compared to the unique identifier 162 or the message identifier associated with the unique identifier 162 to determine whether a match is found. The existence of a unique identifier 162 associated with a message identifier may be indicative of a duplicate message. Further, by storing information related to the message in a data store, certain embodiments of the present invention may be implemented in computing environments such as a clustered computing environments to enable storage of message state in all nodes of a cluster). For example, the data stores, e.g., the data store 160, may facilitate or enable system recovery of messages that were in the process of being communicated.

For each message identifier, the associated stored information may also include information indicative of the delivery status of the message corresponding to the message identifier to the message's intended destination. For example, for a message 108 received by intermediary communication handler 110 from the source 102, intermediary communication handler 110 may store a message identifier for the message 108 and also store information regarding the delivery status of the message 108 to its intended destinations. This delivery status information may be updated as intermediary communication handler 110 receives information about a change in the delivery status (e.g., from "communication pending" to "message received by target"). In certain embodiments, a separate message identifier may be stored in association with a message identifier or other identifier associated with delivery of a message to a destination by the destination server computer 150. The message identifier for the destination server computer 150 may be used by the destination resource manager to manage retries for delivery of a message corresponding to the message identifier. The message identifier used by the destination server computer 150 may be stored in association with a delivery status of a message.

Various different techniques may be used to generate a message identifier for a message. In one embodiment, the message identifier for a message may be generated based upon portions of the contents of the message. For example, a portion of the message may be selected and a message identifier generated by applying a function to the selected portion. Another example, the message identifier may correspond to information already contained in a received message. In another embodiment, a sequence number scheme may be used to generate the message identifiers. In one such embodiment, intermediary communication handler 110 may keep track of a sequence of communications between a source and a target service and assign a message identifier to a message based upon the order of the message in the sequence of communications.

Message identifiers may be used for various different purposes by the intermediary communication handler 110. For example, in one embodiment, the communication manager 130 may use message identifiers to identify duplicate messages. The communication manager 130 may search the data store 160 for a message identifier to determine whether a message identifier is already stored. The existence of a message identifier may indicate that a request was received for delivery of a message associated with the message identifier. In some embodiments, the message identifiers may be stored in association with a message identifier of a message received from a source server computer 140. The existence of an association with the message identifier may be useful to enable the intermediary communication handler 110 to determine whether a new requested message is a duplicate. The determination of whether a message is an original message or a duplicate message may trigger one or more different actions related to delivery of a message by intermediary communication handler 110. For example, if a message is determined to be a duplicate, intermediary communication handler 110 may then determine the delivery status associated with the original message and based upon the delivery status determine whether or not to permit communication of the duplicate message.

The communication manager 130 manager 130 can store a delivery status 164 of the messages (e.g., the message 108 or the message 112) communicated between the source 102 and the target services 104, 106. The delivery status 164 can be stored in association with the message identifier 162. In some embodiments, the delivery status 164 may be stored in association with another message identifier corresponding to the destination server computer 150. The destination server computer 150 may determine whether to retry delivery of a message based on a delivery status associated with message identifier for the destination server computer 150. The delivery status 164 can indicate whether the message has been delivered (e.g., an acknowledgement of delivery has been received), whether the messages has been sent, whether an error has been encountered during delivery of the message, or other status associated with delivery of the message. The communication manager 130 can include an interface that enables the source server computer 140, the destination server computer 150, the intermediary service system 120, or a combination thereof, to notify the communication manager 130 about a change in the delivery status of a message.

The communication manager 130 can determine the delivery status 164 based on the message identifier 162 for a message. The delivery status 164 can be used by the communication manager 130 to determine whether a message is a duplicate of a previously message. The communication manager 130 can use the delivery status 164 to determine whether a duplicate message was has been sent to one or more of the target services 104, 106. The communication manager 130 can determine whether a duplicate message should be communicated to the target service 106, and if not prevent duplicate messages from being communicated to the target service 106. The status of communication (e.g., delivery status of a message) for the messages can enable the communication manager 130 manage communication in the communication system 100. For example, the communication manager 130 can attempt to retry delivery of the message to one of the target services 104, 106 by resending the message.

Figure 2:
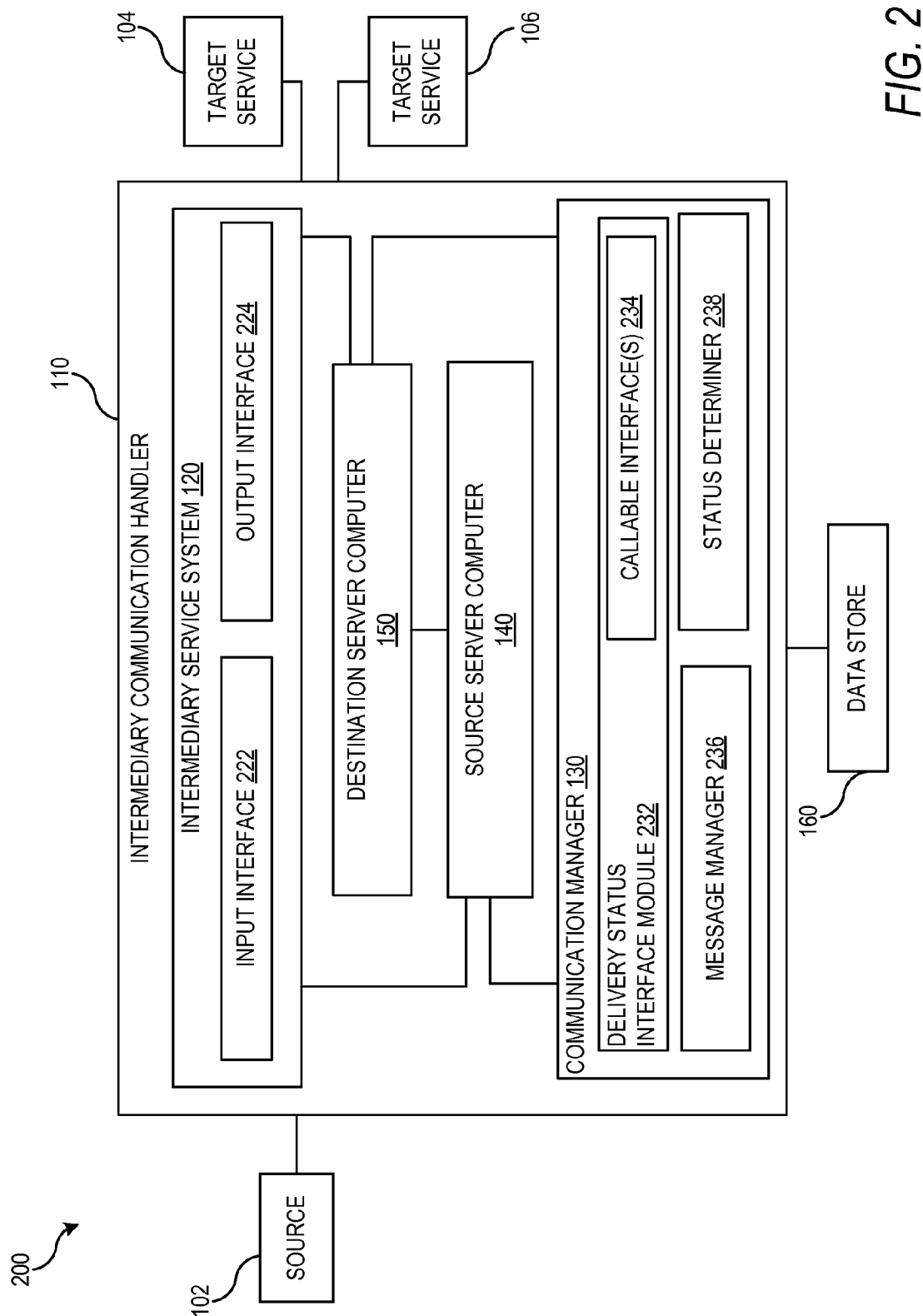
FIG. 2 shows a communication system according to an embodiment of the present invention.
Figure 3:
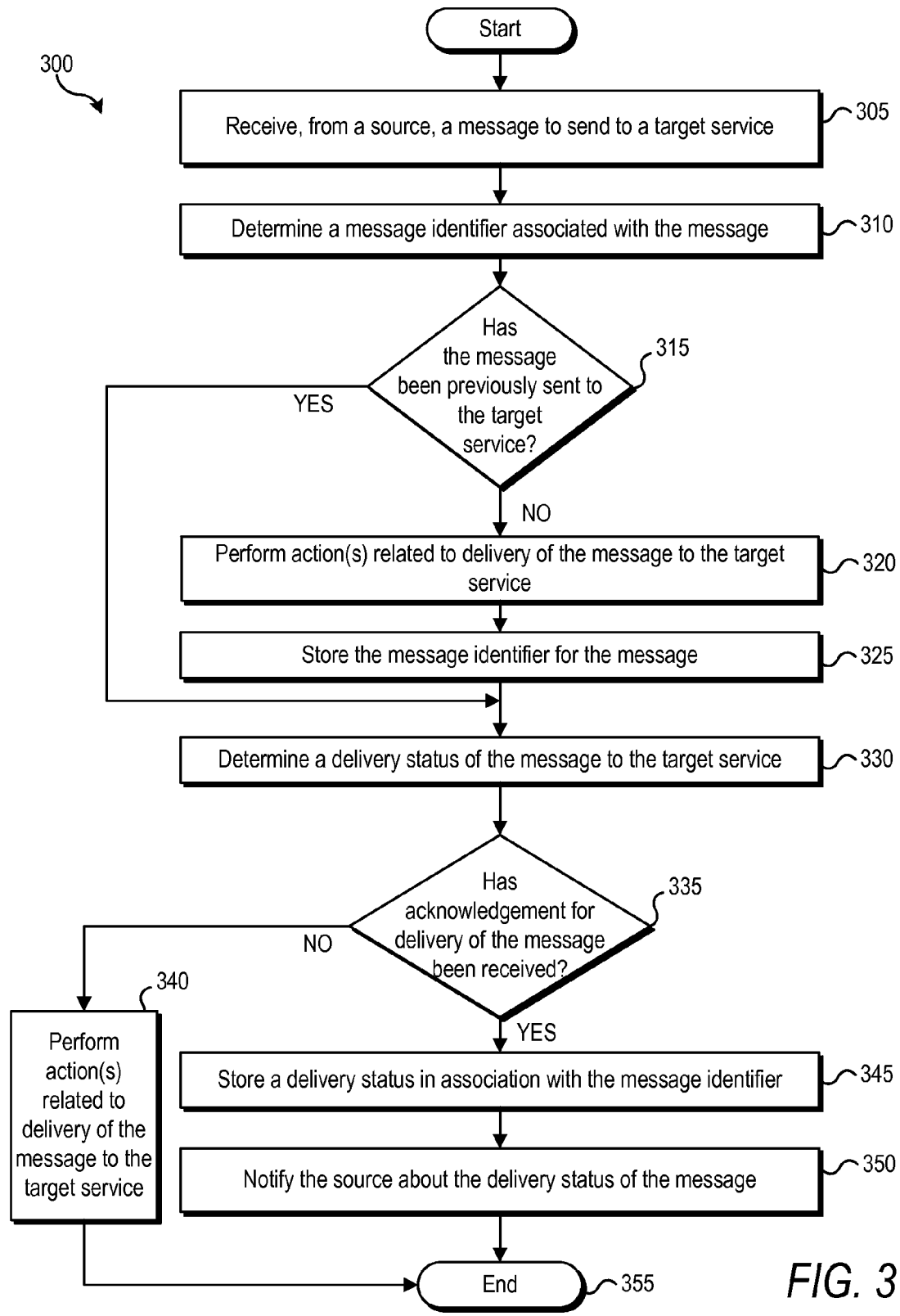
FIG. 3 is a flowchart illustrating a process for managing communication between a source and a target service according to an embodiment of the present invention.

The intermediary communication handler 110 is described further below with reference to FIGS. 2-4. FIG. 2 shows a communication system 200 according to an embodiment of the present invention. The communication system 200 can include like elements of FIG. 1 represented by like reference numbers and designations. The communication system 200 can include one or more sources (e.g., the source 102), one or more target services (e.g., the target service 104 or the target service 106), the intermediary communication handler 110, and the data store 160. The communication system 200 can facilitate reliable communication of messages (e.g., web messages) between the source 102 and the target services 104, 106.

The intermediary service system 120 can communicatively connect one or more sources (e.g., the source 102) with one or more target services (e.g., the target services 104 and the target service 106). The intermediary service system 120 can include or implement one or more interfaces to facilitate the exchange of messages between the source 102 and the target services 104, 106. The intermediary service system 120 can notify the source server computer 140 and/or the destination server computer 150 about a delivery status of a message.

The intermediary service system 120 can be implemented as one or more functional block or modules configured to perform various operations for the communication of messages between a source (e.g., the source 102) and a destination (e.g., the target service 104 or the target service 106). The intermediary service system 120 can include an input interface 222 and an output interface 224. The intermediary service system 120 can process messages asynchronously and deliver them using a protocol supported by a destination where each message can be delivered. For example, the input interface 222 can receive messages (e.g., the message 108) from the source 102 and can deliver the messages to the target service 106 via the output interface 224.

In certain embodiments, the input interface 222 can provide a callable interface (e.g., an application programming interface) that can be invoked by the source 102 to enable the intermediary service system 120 to receive messages from the source 102 for communication to the target services 104, 106. The input interface 222 can receive messages in a format consistent with one or more message communication protocols supported by the sender of the message (e.g., the source 102, the target service 104, or the target service 106). Upon receiving a message, the input interface 222 can place a message on a communication protocol stack of the source server computer 140 for message protocol specific processing. In certain embodiments, the input interface 222 can place the message on a communication protocol stack of the destination server computer 150 for outbound delivery to the destination of the message.

The output interface 224 can provide a callable output interface that can be invoked for delivery of a message to a destination. In certain embodiments, the output interface 224 can be invoked by a web server (e.g., the destination server computer 150) of the intermediary communication handler 110 to send messages to a destination (e.g., the target service 104 or the target service 106). The output interface 224 can send messages in a format consistent with one or more message communication protocols supported by the destination where the messages are to be delivered.

The source server computer 140 can process a received message according to a protocol supported by a sender of the message. In certain embodiments, a message can be processed before requesting the intermediary service system 120 to process the message for delivery to a destination. The source server computer 140 can implement a communication protocol stack by which inbound messages can be received from a source (e.g., the source) are managed and processed. The communication protocol stack may support communication protocols such as a service transport protocol (e.g., HTTP, SMTP, and FTP), a SOAP protocol, or a WS-RM messaging protocol. To request delivery of a message, the source server computer 140 can initiate a request to the intermediary service system 120 to schedule delivery of the message to a destination. The source server computer 140 can provide functionality to indicate exceptions or otherwise notify a source about the delivery status of a message. The source server computer 140 can request information about the delivery status of a message from the communication manager 130. In certain embodiments, the source server computer 140 can communicate additional requests to the intermediary service system 120 to attempt to deliver a message based on the delivery status.

In certain embodiments, the source server computer 140 can send a request to the destination server computer 150 to initiate a communication sequence between a source (e.g., the source 102) and a destination (e.g., the target service 104) before requesting delivery of a message. In certain embodiments, the request can be communicated via the intermediary service system 120. The destination server computer 150 may determine a sequence identifier to assign to the communication between the source server computer 140 and the intermediary communication handler 110. The request to create a communication sequence can be initiated for a first message in a communication sequence between the source 102 and a target service (e.g., the target service 106). An identifier for the message (e.g., the message 108) communicated to the destination can be assigned with the sequence number. The sequence number and the identifier can be associated with the message communicated to the target service. During communication of a message by the intermediary communication handler 110 and the target services 104, 106, the source server computer 140 may ask the destination server computer 150 for a sequence identifier corresponding to the communication.

The destination server computer 150 can process messages to send to the destination. In certain embodiments, the messages can be processed according to a protocol supported by the destination. In some embodiments, the destination web server 150 can receive a request from the intermediary service system 120 to process a message for delivery. A message can be processed before the intermediary service system 120 receives a request to send the message to a destination. The destination server computer 150 can implement a communication protocol stack that manages to be delivered to a destination. The communication protocol stack may support communication protocols such as a service transport protocol (e.g., HTTP, SMTP, and FTP), a SOAP protocol, or a WS-RM messaging protocol.

In certain embodiments, to manage delivery of a message, the destination server computer 150 can associate a transaction with the message. Upon receiving a distinct message for delivery, the destination server computer 150 can create a transaction for the message to be delivered. The destination server computer 150 can manage a status of processing for delivery of a message based on a status of a transaction (e.g., commit or rollback) corresponding to the message. Upon determining that a message is delivered, the destination server computer 150 can attempt to commit the transaction associated with the message to complete the transaction for delivery. Upon determining that a message cannot be delivered, a transaction associated with the message can be rolled back to indicate that the message was not delivered.

Based on the status of delivery, the destination server computer 150 can determine whether to perform any additional actions related to delivery of the message or any duplicate messages. In some embodiments, the destination server computer 150 can obtain the status from the communication manager 130 to determine whether to attempt to request delivery of a message. The status can be used to determine how to manage delivery of duplicate messages. In certain embodiments, the destination server computer 150 can communicate additional requests to the intermediary service system 120 to attempt to re-deliver a message based on the delivery status. In certain embodiments, the destination server computer 150 can communicate with the source server computer 140 via the intermediary service system 120 to provide a delivery status of a message. The destination server computer 150 can communicate a response received from a destination to the communication manager 130 for management of information about delivery of the message.

The communication manager 130 can manage information (e.g., a delivery status) about requests to deliver messages. The communication manager 130 can be implemented as one or more functional block or modules configured to perform various operations for communication of messages between a source and a destination. The communication manager 130 can include a delivery status interface module 232, a message manager 236, and a status determiner 238. The communication manager 130 can be called via one or more of its functional blocks or modules.

The message manager 236 can manage information about messages (e.g., the message identifier 162) and their status (e.g., the delivery status 164) in the data store 160. The message manager 236 can generate a message identifier for each distinct message to be sent to a destination. In certain embodiments, the message manager 236 can generate a message identifier for a distinct message. In some embodiments, the message identifier can be based on one or both of a sequence identifier or an identifier of the messages received from the source server computer 140 for a sequence of communication between the source server computer 140 and the destination server computer 150.

The message manager 236 can manage the delivery status 164 for a message in the data store 160. The delivery status 164 can be maintained in association with the message identifier 162. For example, the delivery status 164 of a message can include information indicating whether the message was accepted for delivery, whether the message was delivered, whether the destination has acknowledged receipt of the message, or whether attempts have been made to redeliver the message. The delivery status enables the communication manager 130 to determine whether a message has actually been delivered to the destination. The delivery status of the message may be maintained and accurate due to the association of the transaction with the message. By doing so, the source server computer 140 is able to communicate successful delivery status to the intermediary service system 120. Further, the intermediary service system 120 may be notified of delivery status when actual delivery of the message occurs, so that a transaction corresponding to the message can be committed.

The status determiner 238 can determine information about a status of communication of messages. Based on a message identifier of a message, the status determiner 238 can identify and retrieve the delivery status 164 associated with the message from the data store 160.

The delivery status interface module 232 can include one or more callable interfaces 234 (e.g., an application programming interface) that, when invoked, can provide the communication manager 130 with information related to a delivery status for a message. The delivery status interface module 232 can execute one or more modules of the communication manager 130 and/or can implement one or more functions that are executed when a callable interface 234 is invoked. For example, the message manager 236 can be executed when the callable interface 234 is invoked to store a delivery status for the message identified by the callable interface 134. The callable interface 234 can accept parameters that specify information (e.g., a true value or a false value) indicating a delivery status. The parameters can include information about the delivery status, such as whether acknowledgement of delivery has been received, whether delivery has failed, or a number attempts to deliver the message.

In some embodiments, an instance of the callable interface 234 can be created for association with a particular message. The instance of the callable interface 234 can be invoked with parameter indicating a status of a message such that the communication manager 130 can be notified about the status of the message. In some embodiments, the callable interface 234 can be invoked for a transaction associated with a message such that the status provided via the callable interface 234 can be associated with a message corresponding to the transaction. For example, the source server computer 140 can create an instance of the callable interface 234, which can be passed to the intermediary service system 120. The intermediary service system 120 can invoke the callable interface 234 upon receiving notification from the destination server computer 150 about a delivery status for a message. In some embodiments, the instance of the callable interface 234 can be passed to the destination server computer 150 and invoked by the destination server computer 150 to provide information to the communication manager 130 about the status of a message.

The intermediary communication handler 110 shown in FIGS. 1 and 2 can enable a source (e.g., the source 102) and a destination (e.g., the target service 106) to exchange communication more reliably. By implementing a communication manager (e.g., the communication manager 130) that can communicate with an intermediary service system (e.g., the intermediary service system 120) and one or more server computers (e.g., the server computers 140, 150), a delivery status of a message can be effectively managed. The delivery status can enable duplicate messages to be detected such that over transmission and/or communication flooding can be reduced if not prevented. The callable interfaces enable the various parties facilitating communication between a source and a target service to be able to reliably determine a delivery status of a message to determine whether retransmission is necessary. By associating delivery of a message with an identifier that is associated with a message identifier and communication sequence, the intermediary communication handler 110 can provide further assurances for reliability of delivery, By having interfaces that enable the intermediary communication handler 110 to remain informed when a message is accepted and delivered, the intermediary can ensure reliability of communication for a message by linking a source sequence of communication with a destination sequence of communication for delivery of a message.

Examples of processes that can be implemented by an intermediary communication handler will now be described. FIG. 3 shows a flowchart illustrating a process 300 for managing communication between a source and one or more target services according to an embodiment of the present invention.

The process 300 can begin at block 305 by receiving, from a source, a message to send to a target service. For example, an intermediary communication handler can receive, from a client device, a message to send to a target service. In the example of a loan application operating on a client device, the loan application can send a message to an intermediary communication handler to send to a destination (e.g., a loan service provided by a application). The message can indicate a request for a service (e.g., a loan calculation) provided by the loan service. A message communicated by a source can be configured according to a format consistent with a message communication protocol (e.g., a WS-RM protocol) supported by the source. The message communication protocol can be similar or different from a message communication protocol supported by a destination. In some embodiments, the message can indicate quality of service parameters that are supported by the message communication protocol support by the source.

At block 310, the process 300 may determine a message identifier associated with the message. For example, when the received message is formatted according to the WS-RM protocol, the intermediary communication handler can determine a message identifier for the message. A message identifier can be determine based on a message sequence number and/or an identifier of the message, a combination of which can uniquely identify the message to a target service. In another example, the intermediary communication handler can determine a message identifier for the message based on a digital signature of the message which uniquely identifies the message. In some embodiments, the digital signature can be used to distinguish one unique message from another while permitting duplicate messages to be detected based on having signatures that match.

At block 315, upon receiving the message, the process 300 may determine whether a message had previously been sent to the target service. For example, the process 300 can determine whether the message is a duplicate of a previous message received by the intermediary communication handler. In some embodiments, the existence of an identifier stored in associated with the determined message identifier in storage accessible to the intermediary communication handler, can be indicative that a duplicate message was previously received and that the intermediary communication handler has attempted to previously send the message to the target service. Upon determining that the message has not previously been sent to the target service, the process 300 proceeds to block 320 to perform one or more actions related to delivery of the message to the target service. Upon determining that the message has previously been sent, the process 300 proceeds to block 330 to determine a delivery status of the message to the target service.

At block 320, the process 300 performs one or more actions related to delivery of the message to the target service. For example, an action may include sending the message to the target service onbehalf of the source. At block 325, the process 300 may store the message identifier for the message. For example, an intermediary communication handler may determining a sequence number and an identifier of the message using a format of the message. The format is based on a communication protocol. An identifier to be associated with the message identifier may be generated based on based on the sequence number and/or the identifier of the message. The identifier may be stored in a data store. In some embodiments, the identifier can be stored in association with a delivery status of the message. The existence of an identifier associated with a message identifier of a message may be used to determine that a message has been sent for delivery to the target service.

At block 330, the process 300 determines the delivery status of the message regarding delivery of the message to the target service. For example, an intermediary communication handler can locate and retrieve information, such as a delivery status, associated with an identifier stored in association with the message identifier for the message. In certain embodiments, the process 300 can periodically or intermittently determine a delivery status of the message. The process 300 can determine the status immediately after sending the message or periodically for a time period after the message have been sent.

At block 335, the process 300 can use the status of the message to determine whether an acknowledgement for delivery of the message has been received. After a period of time subsequent to sending the message, the process 300 can use the status to determine whether acknowledgement has been received from the target service. In some embodiments, receipt of acknowledgement from the target service can be indicative of delivery of the message.

Upon determining that an acknowledgement has been received, the process 300 can proceed to block 345 to store the status of the delivery in association with the generated identifier. Upon determining that an acknowledgement has not been received, the process 300 can proceed to block 340, where it can perform one or more actions related to delivery of the message to the target service. For example, an action related to delivery of the message can include attempting to retry delivery of the message to the target service by resending the message to the target service. In some embodiments, an intermediary communication handler may communicate the delivery status to a network communication server included in or implemented by the intermediary communication handler for the target service. The network communication server can use the delivery status to determine a manner by which to handle further communication of the message based on quality of service standards associated with a communication protocol supported by the target service. After performing the process 300 at block 340, the process 300 can end at block 355.

Returning to block 345, after storing the delivery status for the message, the process 300 can proceed to block 350 to notify the source about the delivery status for the message. For example, the intermediary communication handler can send information (e.g., an acknowledgement message) to the source to indicate that the message has been delivered. The process 300 can end at block 355.

In certain embodiments, the process 300 can be implemented by certain embodiments of the intermediary communication handler 110 of FIG. 1. Upon receiving a message from the source 102, the intermediary communication handler 110 can determine whether the received message has been previously sent to the target service. The communication manager 130 can determine whether an identifier is associated with a message identifier of the received message. The communication manager 130 can determine whether the message was previously sent based on whether an identifier exists in the data store 160 for the message. The communication manager 130 can send, via the intermediary service system 120, the message to the target service 106 upon determining that the message was not previously sent. The communication manager 130 can store message identifier of the message to indicate that the message has been sent if not already previously sent.

Subsequent to ensuring that the message is sent if it has not previously been sent, the intermediary communication handler 110 can determine the delivery status for the message periodically or in response to a request (e.g., "ACK" request message) from the source 102. Upon determining that acknowledgement has not been received, the intermediary communication handler 110 can perform one or more actions related to delivery of the message to the target service 106. Otherwise, if acknowledgement for delivery of the message has been received, then the intermediary communication handler 110 can store the delivery status and notify the source about the delivery status.

Process 300 can be performed in an iterative manner for each message that is received from a source. Alternatively or additionally, blocks 330-355 can be performed during a period of time after the a message has been sent. In particular, block 335 can be performed periodically or intermittently until it is determined that acknowledgement has in fact not been received. In some embodiments, a determination as to whether acknowledge has been received can be determined based on whether the intermediary communication handler has been informed of the delivery status to the target service. In some embodiments, the status of the delivery can be determined based on whether a response has been received from the target service after a period of time. A lack of response may be indicative that acknowledgement has not been received. Based on the determination regarding acknowledgement for delivery of the message, the intermediary communication handler can determine what actions to take (e.g., determining whether to continue waiting for delivery of the message, to retry delivery, or to stop waiting for delivery of the message).

It will be appreciated that process 300 is illustrative and that variations and modifications are possible. Action or operations described for process 300 as sequential may be executed in parallel and/or order of operations may be varied, and operations may be modified, combined, added or omitted.

Figure 4:
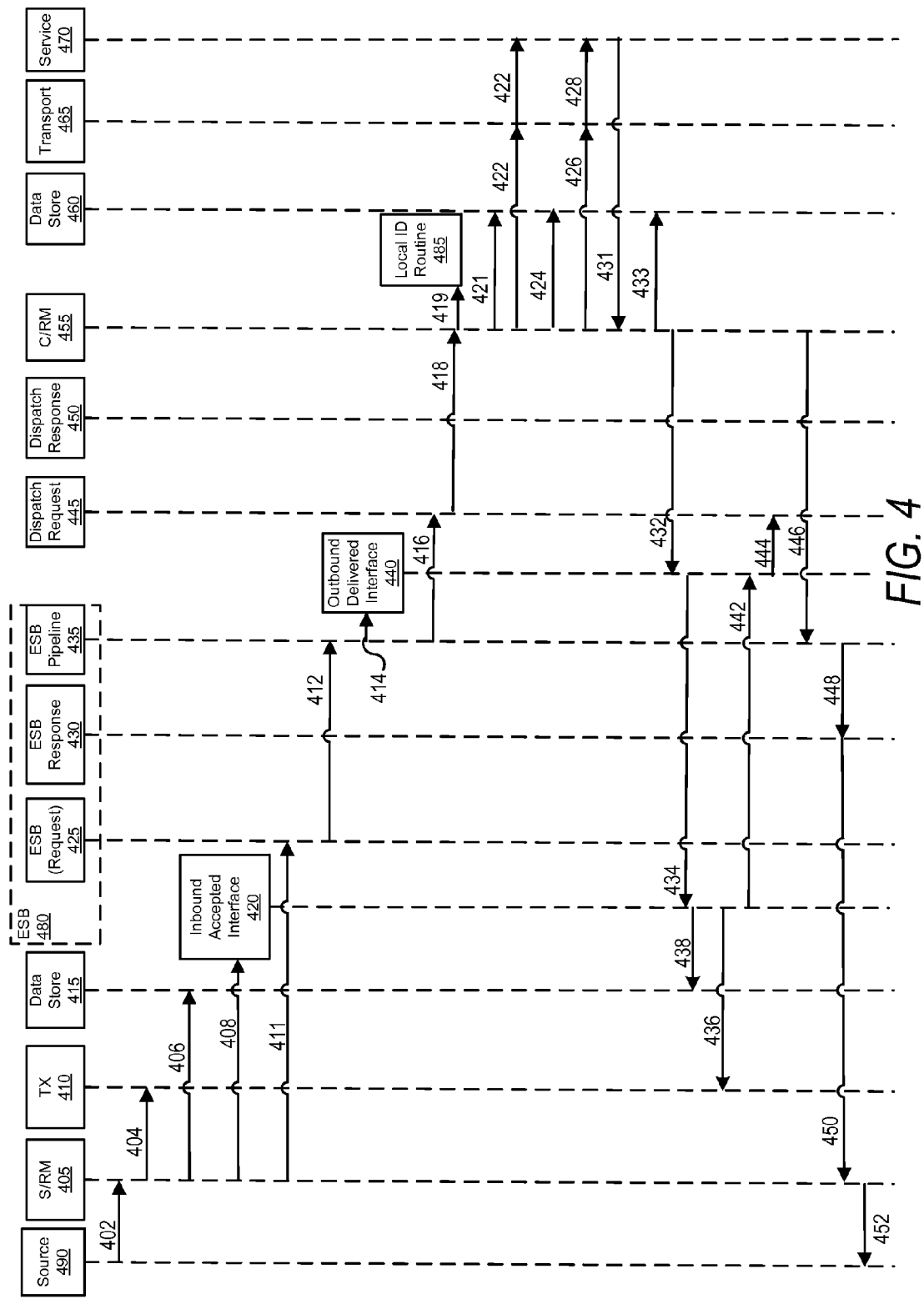
FIG. 4 is a sequence diagram illustrating a process for managing communication between a source and a target service according to an embodiment of the present invention.

FIG. 4 shows a sequence diagram illustrating a process 400 for managing communication between a source 490 (e.g., the source 102) and a service 470 (e.g., a target service 106) according to an embodiment of the present invention. In certain embodiments, the process 400 can be implemented by the intermediary communication handler 110.

The intermediary communication handler 110 may provide the source 490 with reliable information about a delivery status of a message (e.g., the message 108) to be delivered to the service 470 using one or more callable interfaces and/or an intermediary service system that may provide the intermediary communication handler 110 with information related to delivery status for the message. The delivery status can be used by the intermediary communication handler 110 to determine whether additional actions (e.g., retry delivery) should be performed or whether the source should be notified about a delivery status for delivery of a message. The delivery status further enables the intermediary communication handler 110 to manage and prevent communication of duplicate messages to a destination. The delivery status may enable a destination server computer to determine whether QoS parameters associated with a communication protocol supported by the service 470 are being satisfied.

For purposes of illustration, the example presented in FIG. 4 is described with respect to message communication between the source 490 and the service 470 using a communication protocol, e.g., the WS-RM protocol. The source 490 may act as a reliable messaging source (RMS). The service 470 may act as a reliable messaging destination (RMD) (e.g., a web services reliable messaging destination). A client resource manager (e.g., "C/RM") 455 may operate as a source server computer (e.g., the source server computer 140). A destination resource manager (e.g., "S/RM") 405 may operate as a destination server computer (e.g., the destination server computer 150). Communication of messages (e.g., a message 402) from the RMS 490 to the RMD 470 may occur via an intermediary service system, e.g., an enterprise service bus (ESB) 480. Process 400 is described below and provides further details regarding communication of messages from the RMS 490 to the RMD 470.

In certain embodiments, a communication protocol such as the WS-RM protocol may support one or more parameters that define a quality of service (QoS) parameters for reliable message communication. The QoS parameters may include one or more of the following:

At least once ("AtLeastOnce")—Each message is delivered to a destination at least once. If a message cannot be delivered, an error can be raised by the RMS and/or the RMD. Messages may be delivered to the destination more than once (i.e., the destination may receive duplicate messages).

At most once ("AtMostOnce")—Each message will be delivered to a destination at most once. The destination may not receive duplicate messages.

Exactly once ("ExactlyOnce)—Each message will be delivered to a destination exactly once. If a message cannot be delivered, an error can be raised by the RMS and/or the RMD. The destination may not receive duplicate messages.

In order ("InOrder")—Messages will be delivered from the RMD to a destination in the order that they are sent from a source to the RMS. This assurance can be combined with any of the above assurances.

Process 400 can begin by the S/RM 405 receiving the message 402 from the source 490 for a service provided by the service 470. The message 402 can be received via an intermediary service system, e.g., an enterprise service bus (ESB) 480. The ESB 480 may be included or implemented by the intermediary service system 120. Before sending the message 402, the source 490 may request the S/RM 405 to create a sequence (e.g., "CREATE_SEQUENCE"). The sequence is created to ensure reliable communication between the source 490 and the S/RM 405. The S/RM 405 may assign a sequence number for the sequence of communication between the source 490 and the S/RM 405. The message 402 may be sent using the sequence number created by the S/RM 405. In some embodiments, the source 490 may determine a unique identifier for association with the message 402. The sequence number and the message identifier may be communicated with the message 402.

Upon receiving the message 402, the process 400 can request 404 a transaction function 410 to be performed. The transaction function (TX) 410 can be performed by the S/RM 405. For the request 404, a transaction can be created to be associated with the message 402. The transaction can be used for managing delivery of the service 470 to the source 490. In some embodiments, the transaction can be created for each unique message (e.g., the message 402) corresponding to a request for the service 470. The context of a transaction may be used to manage delivery of the message 402 to ensure that the source 490 does not received an acknowledgement until the transaction associated with the message is committed.

After creating a transaction, the S/RM 405 can request 406 that information about the message 402 be stored in a data store 415. In certain embodiments, the S/RM 405 may request the communication manager 130 of FIG. 1 (not shown in FIG. 4) to store metadata (e.g., a message identifier) related to the message 402 in the data store 160. The message identifier can include a unique identifier that distinguishes the message 402 from other messages communicated by the source 490. The metadata can be stored to enable the communication manager 130 to prevent duplicate messages from being communicated to the service 470. In certain embodiments, the data store 415 can store data in a different data store than the data store 460 used by the C/RM 450. The data store 415 and the data store 460 can be implemented or included in one or more data stores, such as the data store 160.

After performing functions to store information for the message 402, the process 400 can include the S/RM 405 sending a request 408 to create an instance of a callable interface (e.g., the callable interfaces 234) of the delivery status interface module 232 to be generated. In certain embodiments, the callable interfaces 234 can include an inbound accepted interface 420. The inbound accepted interface 420 can include parameters to specify a status indicating whether the message 402 has been accepted. In some embodiments, a status that a message is accepted can also indicate that the message has been delivered. The instance of the inbound accepted interface 420, when invoked, can initiate execution of the delivery status interface module 232, which can perform an inbound accepted routine to store information about a status of the message 402 indicated by the parameter of the inbound accepted interface 420.

The process 400 can include the S/RM 405 sending a request 411 to a request function 425 (e.g., provide request function) of an ESB 480. The request 411 can be invoked on the same transaction context for the message 402. The transaction context for the message 402 can be used to ensure that the S/RM 405 does not received notification about delivery of the message 402 corresponding to the transaction. The request function 425 can be invoked to initiate the ESB 480 to perform processing of the message 402 to send to the service 470. The request 411 can include the instance of the inbound accepted interface 420. The inbound accepted interface 420 can be invoked at a later time when the ESB 480 has been notified about a delivery status of the message 402.

In response to receiving the request 411, the process 400 can include the ESB 480 sending a request 412 to a processing pipeline 435 of the ESB 480 to queue the message 402 for communication to the C/RM 450 for further processing. Upon determining that the message 402 can be taken from the pipeline 435 for further processing, the process 400 can include the ESB 480 communicating a request 416 to the C/RM 455 via a dispatch request function 445. The dispatcher request function 445 puts messages (e.g., the message 402) at the beginning of an outbound processing chain of the C/RM 455.

In some embodiments, before calling the dispatch request function, the process 400 can include the ESB 480 communicating a request 414 to create an instance of the callable interface (e.g., the callable interfaces 234) of the delivery status interface module 232. In such embodiments, the callable interfaces 234 can include an outbound delivered interface 440. The outbound delivered interface 440 can include parameters to specify a status indicating whether "outbound" delivery of the message 402 to the service 470 has been acknowledged. The instance of the outbound delivered interface 440, when invoked, can initiate execution of the delivery status interface module 232 to perform an outbound delivered routine that can store information about a status of the message 402 indicated by the parameter of the outbound delivered interface 420. Specifically, the status can indicate whether the message 402 has been delivered. The status can be based on receipt of an acknowledgement response from the service 470 indicating delivery of the message 402.

In certain embodiments, the instance of the outbound delivered interface 440, can be included in the request 416 to the dispatcher request function 445. The dispatcher request function 445 can provide the instance of the outbound delivered interface 440 to the C/RM 455. The C/RM 455 can invoke the outbound delivered interface 440 to store a status of outbound delivery of the message 402 for the communication manager 130. In some embodiments, the instance of the outbound delivered interface 440 may not be created when outbound delivered interface 440 was previously invoked for a message that is a duplicate of the message 402.

The process 400 can include a C/RM 455 receiving a request 418 in response to the request 416 for the dispatcher request function 445. The C/RM 455 can perform further processing for the message 402 before proceeding to attempt delivery of the message 402 to the service 470. The C/RM 455 may determine a unique message identifier for the message 402 by invoking 419 a get local ID routine 485. The message identifier may be used by the C/RM 455 to avoid sending duplicates to the service 470. In some embodiments where the source 490 has web services reliable messaging support, the get local ID routine 485 may use the sequence number as the message identifier. In some embodiments, the get local ID routine 485 may be implemented by the ESB 480. The get local ID routine 485 may determine the message identifier based on a digital signature of the message 402. The message identifier can also be used by the communication manager 130 to keep track of delivery status of a message associated with the message identifier. The communication manager 130 can identify duplicate messages attempted for delivery to the service 470 based on a message identifier determined from the get local ID routine the message 402.

The C/RM 455 may determine another message identifier to be associated with the the message 402 to keep track of delivery status for the message 402. The process 400 can include the C/RM 455 sending a request 422 to the service's 470 RMD to create a new sequence (e.g., "CREATE_SEQUENCE) between the C/RM 455 and the RMD 470. The C/RM 455 may determine an identifier based on the sequence number. The service 470 may assign a sequence number for the message and return the sequence number to the C/RM 455. The message 402 may be sent to the service 470 using the sequence number. The C/RM 455 may maintain the identifier for the message 402 to manage retries for delivery to the service 470. The sequence associated with the communication between the source 490 and the S/RM 405 may be linked to the sequence associated with the communication between the C/RM 455 and the RMD 470 such that if a sequence from the C/RM 445 to the RMD 470 fails, then the reliability sequence between the source 490 and the S/RM 405 may fail as well.

The process 400 can include the C/RM 455 communicating with the communication manager 130 to request 421 information about the message 402 to be managed in the data store 460. The communication manager 130 can store its message identifier used to keep track of the message identifier associated with the message 402. The message identifier generated by the communication manager 130 may be associated with the sequence number and/or message identifier for the message 402 when the service 470 uses a sequence number and message identifier for its protocol. Storing the generated message identifier in association with the sequence number and/or message identifier of the message 402 can enable the delivery status for the message to be tracked to determine whether a duplicate message was previously sent. The existence of the message identifier can indicate that the message 402 is a duplicate of a message previously sent. In some embodiments, the communication manager 130 can be requested 421 to search of the data store 460 to identify information stored in association with the message identifier (e.g., the message identifier 162). The data store 460 can be searched using a unique digital signature of the message 402 or other information identifying the message to determine if a message identifier is stored for the message 402. If the message identifier is not found, then the communication manager 130 can be requested 424 to store the message identifier in the data store 460, otherwise to use the message identifier found in the data store 460 associated with the message 402.

The process 400 can include the C/RM 455 sending a request 426 to the service 470 via a transport routine 465. The transport routine 465 can be provided as an interface (e.g., the output interface 224) of the ESB 480. In some embodiments, the transport routine 465 can be included or implemented in the output interface 224. Then, the process 400 can include the transport routine 465 sending a request 428 to the service 470 in response to receiving the request 426. The transport routine 465 can deliver the message 402 to the service 470. The process 400 can include the C/RM 455 sending subsequent requests 426 to the service 470 to attempt to redeliver the message 402. The C/RM 455 may use the previous message identifier associated with the message 402 to associate with the delivery status for the message 402.

The C/RM 455 can wait until a response 431 is received from the transport routine 465. The response 431 can indicate a result of an attempt to deliver the message 402. The response 431 can include response data and metadata indicating acknowledgment (e.g., an "ACK" message") that the message 402 was delivered to the target service or indicating that no acknowledgement was received. The process 400 can include the C/RM 455 communicating with the communication manager 130 to request 433 information in the response 431, such as the result, to be stored in the data store 460.

Upon determining that delivery of the request 428 failed, the process 400 can include the service 470 sending a response 431 to the C/RM 455 indicating that the request 428 to deliver the message 402 failed. In some embodiments, the service 470 may not send the result indicating that delivery failed. The C/RM 455 may attempt to send another request 426 to the service 470 via the transport routine 465 after a period of time. In certain embodiments, the C/RM 455 can retry delivery of the message 402 based on one or more criteria for retrying delivery. The one or more criteria for delivery can be based on QoS parameters for the communication protocol supported by the service 470. The one or more criteria can indicate a number of attempts to retry delivery and a timeout period of retrying delivery. In some embodiments, the transport routine 465 can include a parameter indicating whether the request 426 is to be retried. The outbound delivered interface 440 can be invoked with a parameter indicating a status (e.g., not delivered) that outbound delivery of the message 402 to the service 470 was not made.

Upon determining that the request 426 will not be retried and therefore, will be delivered, the process 400 can include the C/RM 455 requesting 432 the instance of the outbound delivered interface 440 to be invoked. Upon determining that the response 431 indicates an acknowledgement of delivery for the message 402, the process 400 can include the C/RM 455 requesting 432 that the instance of the outbound delivered interface 440 be invoked with a parameter indicating a status (e.g., delivered) that outbound delivery of the message 402 was made.

The process 400 can include a request 434 to invoke the inbound accepted interface 420 when the ESB 480 has been notified of a delivery status of the message 402. For example, in response to the outbound delivered interface 440 being invoked, the inbound accepted interface 420 provided to the ESB 480 can be invoked by the ESB 480 for the same transaction context associated with the message 402. The instance of the inbound delivered interface 420 can be invoked on the same transaction context for the message 402 to call dispatch request 445 to ensure that the delivery status is associated with the message 402 and not any other message. The inbound accepted interface 420 can be invoked with a parameter indicating the delivery status of the message 402. The delivery status of the message 402 specified as a parameter to the inbound accepted interface 420 can be based on the delivery status indicated by the outbound delivery interface 440. For example, a status provided to the inbound interface function 420 can indicate that the message 402 was delivered or that the message 402 was not delivered based on the delivery status indicated by the outbound delivery interface 440.

In response to the inbound accepted interface 420 being invoked, the process 400 can include the delivery response interface module 232 of the communication manager 130 being invoked to determine the delivery status based on a status indicated by the parameter of the inbound accepted interface 420. The process 400 can include the delivery status interface manager 232 providing the delivery status for the message 402 to the message manager 236 to update the delivery status 164 in the data store 415 (e.g., the data store 160). In some embodiments, the process 400 can include the communication manager 130 storing the delivery status in the data store 460 (e.g., the data store 160), which can be maintained for the C/RM 455.

In certain embodiments, by invoking the inbound delivery interface 420 indicating that the message has been delivered (e.g., "InboundAccepted=TRUE"), the transaction associated with the message 402 can be committed. By invoking the inbound delivery interface 420 indicates that the message has not been delivered (e.g., "InboundAccepted=FALSE"), the transaction associated with the message 402 can be rolled back.

Upon determining that the delivery status indicates that the message 402 has been delivered based on receiving acknowledgement, the process 400 can include the communication manager 130 requesting 438 the data store 415 to be updated to indicate that the message 402 has been delivered. The process 400 can include the communication manager 130 requesting 436 that the transaction associated with the message 402 be committed if acknowledgement was received for delivery of the message 402. By committing the transaction, the message 402 has been delivered. In some embodiments, if the commit succeeds, the process 400 can include the communication manager 130 storing information in the data store 415 to indicate that the transaction is complete (e.g., committed) and/or the message 402 has been delivered (e.g., acknowledged). If the commit is not successful, the process 400 can include the communication manager 130 updating the data store 415 to indicate that the message 402 cannot be committed. In some embodiments, the transaction may not be committed when the transaction context associated with the message 402 is active and other operations are being performed for transaction.

Upon determining that the delivery status indicates that the message 402 cannot be delivered and therefore, that acknowledgement of delivery was not received for the message 402, the process 400 can include the communication manager 130 requesting 438 the data store 415 to be updated to indicate that the message 402 has not been delivered. The process 400 can include the communication manager 130 requesting 436 that the transaction for the message 402 be rolled back. By rolling back the transaction, the status of deliver of the message 402 may be as undelivered. In some embodiments, the process 400 can include the inbound accepted interface 420 requesting the information in the data store 415 to indicate that the transaction has not been performed (e.g., rolled back) and that the message 402 cannot be delivered.

After the inbound accepted interface 420 has performed processing in response to the request 434, the process 400 can include inbound accepted interface 420 communicating, to the outbound delivered interface 440, a result 442 of the request 434 to the ESB response routine 430. In some embodiments, the inbound accepted interface 420 can request the result 442 to be provided to the outbound delivered interface 440.

The process 400 can include the communication manager 130 determining whether to end communication for the message 402 based on the result 442. Upon determining the result 442 indicates that the message 402 was delivered and that the transaction for the message 402 was committed, the process 400 can include the outbound delivered interface 440 requesting 444 the dispatch request function 445 to terminate communication (e.g., terminate a communication sequence) between the S/RM 405 and the C/RM 455 for the message 402. By terminating the communication, the communication manager 130 can delete information about the message 402 including the message identifier stored in association with the message 402. As a result, the delivery status of the message 402 may no longer be maintained in association with the message 402.

However, upon determining the result 442 indicates that the message 402 was not delivered and/or that the transaction for the message 402 was not committed, the process 400 can include the outbound delivered interface 440 preventing termination of the communication between the S/RM 405 and the C/RM 455. When the communication between the S/RM 405 and the C/RM 455 is not terminated, the information about the message including the message identifier 402 may remain stored in the data store 460 such that the delivery status of the message 402 remains associated with the message identifier. By maintaining the message identifier in the data store 460, the C/RM 455 can request the communication manager 130 to determine a delivery status for the message 402. The message identifier generated by the communication manager 130 to manage delivery status of the message 402 can be removed from the data stores 460, 415 when the communication sequence between the S/RM 405 and the C/RM 460 has terminated. In certain embodiments, the message identifier can be removed from storage in association with the message 402 the communication sequence has existed for a period of time. In some embodiments, the message identifier can be stored in association with a time period for termination of the communication sequence between the S/RM 455 and the C/RM 405. The message identifier can be removed in the event that QoS criteria have been exceeded such that the communication sequence will terminate.

The process 400 can include C/RM 455 sending a request 446 to the processing pipeline 435 of the ESB 480 to communicate response data from the result 431. The processing pipeline 435 of the ESB 480 may request 448 the ESB response routine 430 to deliver the response data to S/RM 405 for delivery to the source 490. The delivery status of the message may be included in the request 448. The S/RM 405 may communicate a request 452 the response data from the result 431 to the source 402.

In the example of process 400 shown in FIG. 4, a delivery status managed in association with a message identifier (e.g., a sequence number and identifier of a message) can be used to manage delivery of a message. Implementation of a communication manager in an intermediary communication handler can enable various components (e.g., an C/RM, an S/RM, a target service RMD, and an ESB) of a communication system to share, via a callable interface, a delivery status as delivery status changes. The various components can remain notified by an intermediary communication handler such that a sender (e.g., a source) can remain notified about delivery and that retry attempts for delivery can be properly managed. In some embodiments, by sending a duplicate message for delivery using the same sequence number and identifier of the message, a server computer supporting a target service can maintain quality of service parameters according to a protocol supported for the message 402.

Figure 5:
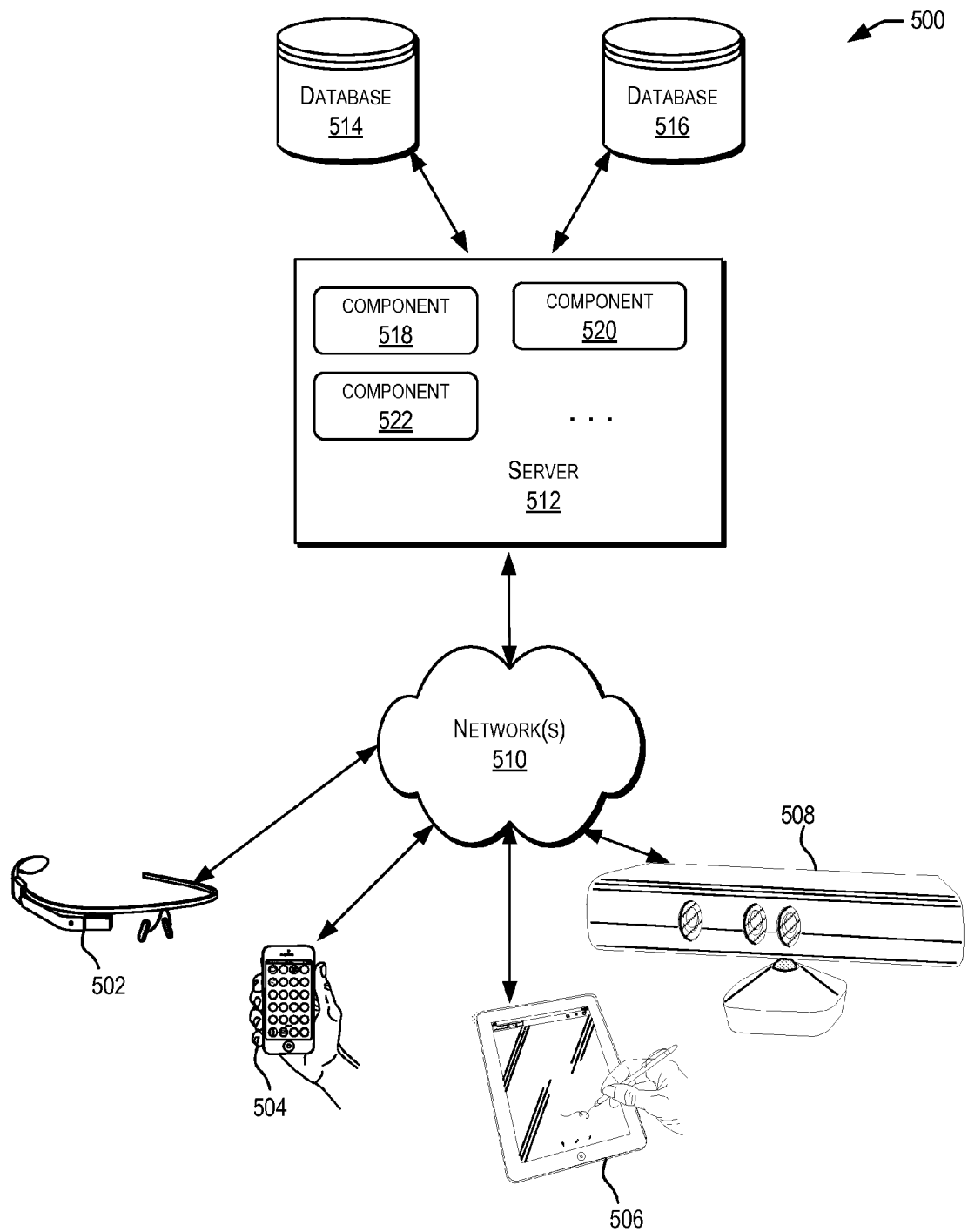
FIG. 5 depicts a simplified diagram of a distributed system for implementing one of the embodiments.

FIG. 5 depicts a simplified diagram of a distributed system 500 for implementing one of the embodiments. The distributed system 500 can implement the communication system 100 of FIG. 1 and/or the communication system 200 of FIG. 2. The distributed system 500 can implement the process 300 of FIG. 3 and/or the process 400 of FIG. 4. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. In certain embodiments, the one or more client computing devices 502-508 can include the source 102 of FIG. 1 and/or the target services 104, 106 of FIG. 1. Server 512 may be communicatively coupled with remote client computing devices 502, 504, 506, and 508 via network 510. The server 512 can include the source server computer 140 of FIG. 1 and/or the destination server computer 150 of FIG. 1.

In various embodiments, server 512 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in FIG. 5 is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like.

Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization. One or more flexible pools of logical storage devices can be virtualized to maintain virtual storage devices for the server. Virtual networks can be controlled by server 512 using software defined networking. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands. The data store 160 of FIG. 1 can be included in the one or more databases 514 and 516.

Figure 6:
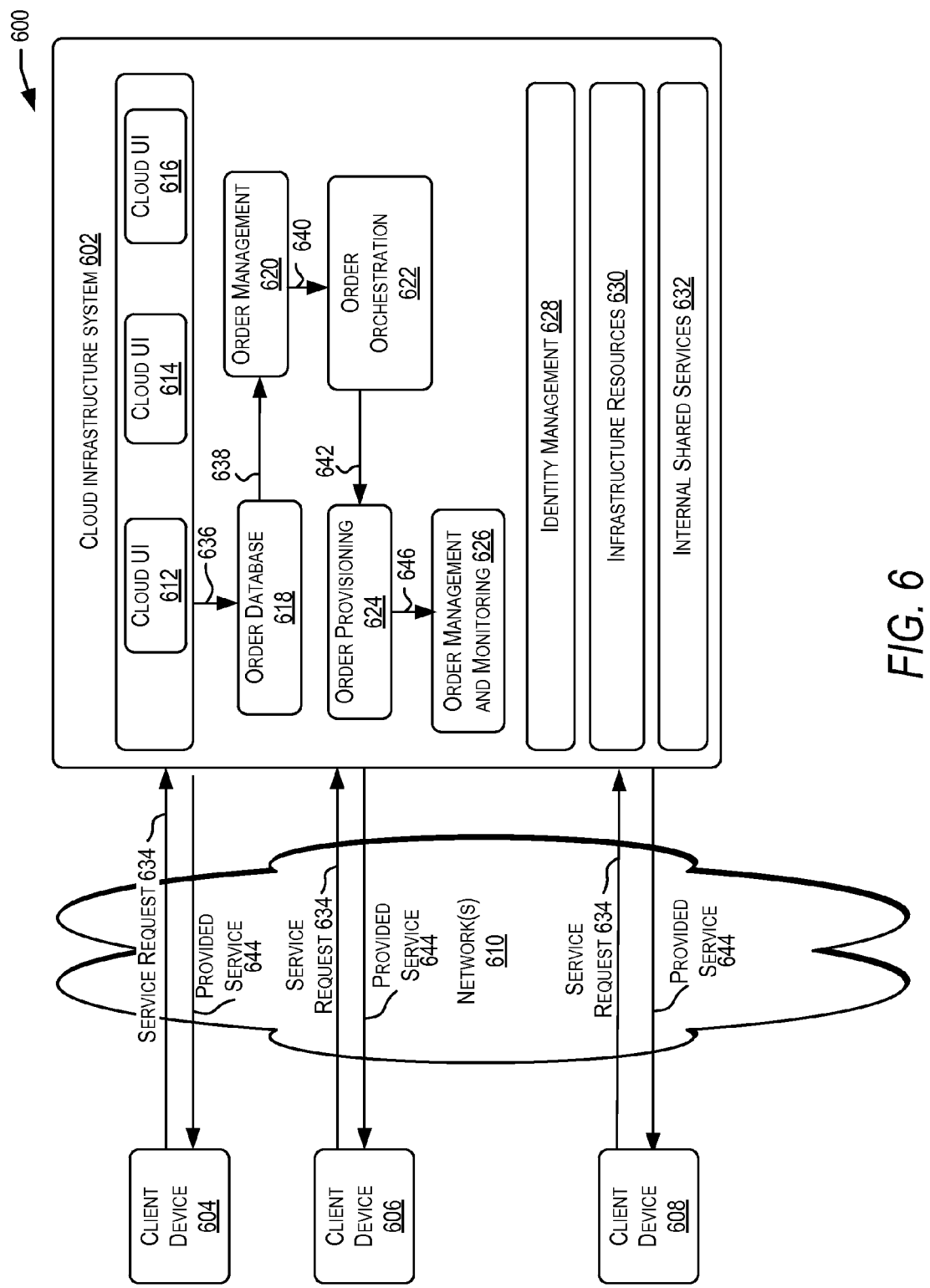
FIG. 6 is a simplified block diagram of components of a system environment by which services provided by the components of an embodiment system may be offered as cloud services, in accordance with an embodiment of the present disclosure.

FIG. 6 is a simplified block diagram of one or more components of a system environment 600 by which services provided by one or more components of an embodiment system may be offered as cloud services, in accordance with an embodiment of the present disclosure. The system environment 600 can include or implement the communication system 100 of FIG. 1 and/or the communication system 200 of FIG. 2. The system environment 600 can implement the process 300 of FIG. 3 and/or the process 400 of FIG. 4. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in FIG. 6 may have other components than those depicted. Further, the embodiment shown in FIG. 6 is only one example of a cloud infrastructure system that may incorporate an embodiment of the invention. For example, the cloud infrastructure system 602 can include or implement one or more elements of the communication system 100 and/or the communication system 200. In another example, the target services 104, 106 may be included or implemented by the cloud infrastructure system 602. In some other embodiments, cloud infrastructure system 602 may have more or fewer components than shown in FIG. 6, may combine two or more components, or may have a different configuration or arrangement of components.

Client computing devices 604, 606, and 608 may be devices similar to those described above for 502, 504, 506, and 508.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in FIG. 6, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of business processes associated with each order and applies business logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.). Identity management module 628 may also include the management of descriptive information about each customer and about how and by whom that descriptive information can be accessed and modified.

Figure 7:
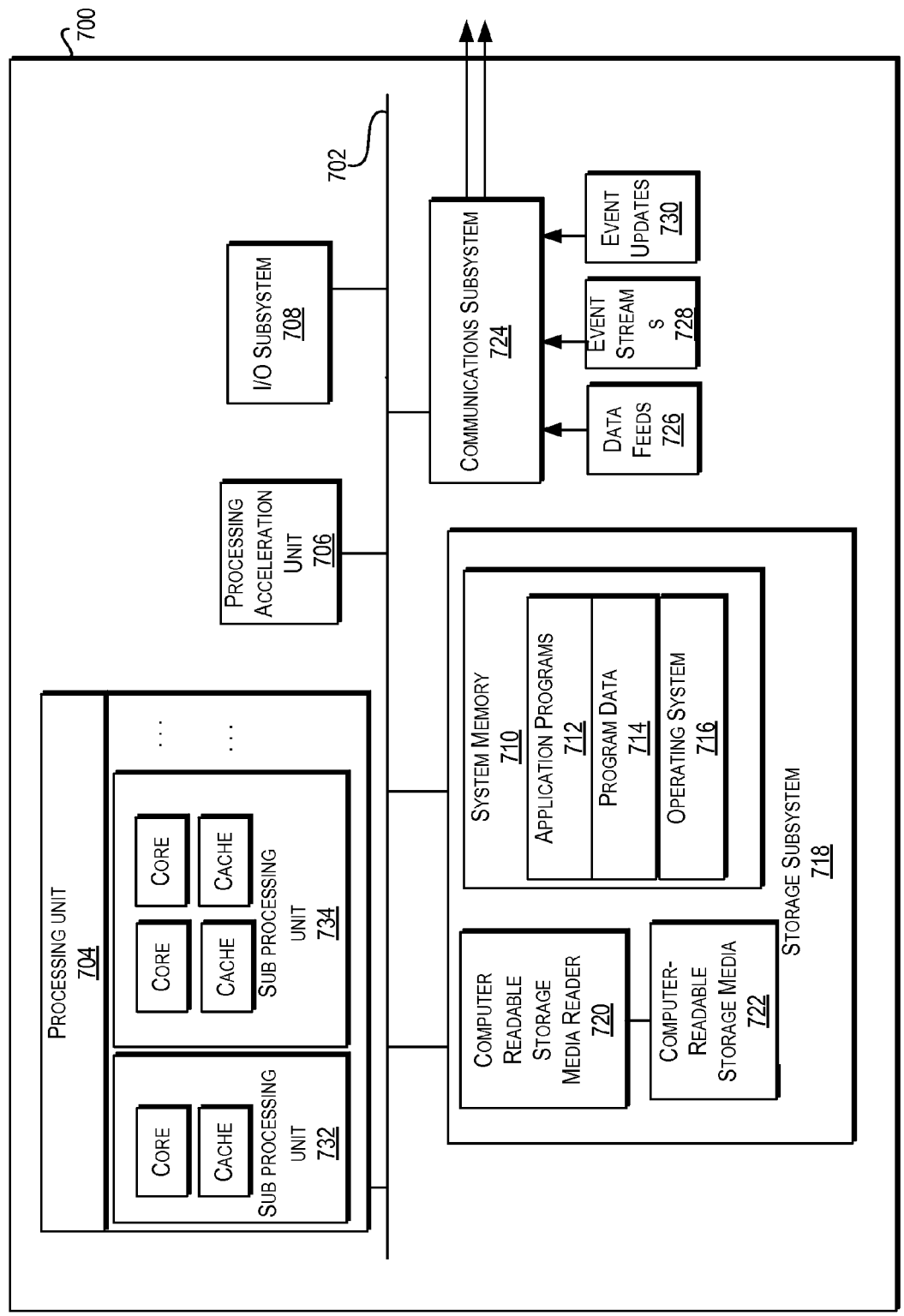
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. For example, all or some of the elements of the communication system 100 of FIG. 1 and the communication system 200 of FIG. 2 can be included or implemented in the system 700. The system 700 can implement one or both of the process 300 of FIG. 3 or process 400 of FIG. 4. As shown in FIG. 7, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in FIG. 7 is intended only as a specific example. Many other configurations having more or fewer components than the system depicted in FIG. 7 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
receiving, by a computing system of an intermediary communication system, from a source, a message to send to a target service;
determining, by the computing system, a message identifier associated with the message;
determining, by the computing system, based upon the message identifier, that the message is similar to a previous message that has previously been sent to the target service, wherein the previous message has previously been sent based upon receiving the previous message from the source, and wherein each of the message and the previous message has a format corresponding to a Web Services-Reliable Messaging (WS-RM) protocol;
retrieving, at the intermediary communication system, a delivery status identifier associated with the previous message, wherein the delivery status identifier indicates an status about a delivery of the previous message by the intermediary communication system, wherein the status is updated to indicate that the intermediary communication system received an acknowledgment of the previous message from the target service, the acknowledgment being sent by the target service to the intermediary communication system in response to the intermediary communication system sending the previous message to the target service;
determining, by the computing system, whether the previous message has been delivered to the target service based upon a delivery status of the previous message, wherein the delivery status is determined based on the retrieved delivery status identifier;
upon determining that the previous message has been delivered to the target service, preventing, by the computing system, the message from being sent to the target service; and
upon determining that the previous message has not been delivered to the target service, performing, by the computing system, one or more actions related to facilitating the message be sent to the target service.

2. The method of claim 1, further comprising:
determining whether the message identifier matches one of a plurality of identifiers stored in a data store, wherein each of the plurality of identifiers is associated with a different message that was received from the source and that was previously sent to the target service, and wherein determining that the message identifier matches a first identifier stored in the data store for the previous message indicates that the message is similar to the previous message that has previously been sent to the target service.

3. The method of claim 2, further comprising:
upon determining that the message identifier does not match one of the plurality of identifiers in the data store:
generating a new identifier to be associated with the message identifier, wherein the new identifier is generated based on information from the message; and
storing the new identifier in the data store for the message.

4. The method of claim 3, further comprising:
determining a message sequence number of the message, wherein the message sequence number is based on a sequence of communication of the message using a communication protocol, and wherein the new identifier associated with the message is generated based on the message sequence number and the message identifier of the message.

5. The method of claim 3, wherein performing an action related to facilitating delivery of the message includes sending the message to the target service, and wherein the message is sent with information indicating a sequence number and the message identifier of the message.

6. The method of claim 1, further comprising:
receiving, via a delivery status interface, from an intermediary service system, information indicating that the previous message has been delivered to the target service;
storing the information indicating that the previous message has been delivered to the target service, wherein the information is stored in association with an identifier associated with the previous message; and
sending, to the source, the information indicating that the previous message has been delivered to the target service.

7. The method of claim 1, further comprising:
determining whether acknowledgement has been received by the computing system from the target service for delivery of the previous message to the target service, wherein delivery of the previous message to the target service is determined based on whether the acknowledgement has been received; and
upon determining that the previous message has not been delivered to the target service:
sending the previous message to the target service.

8. An intermediary communication system comprising:
a memory; and
one or more processors coupled to the memory, wherein the one or more processors are configurable to:
receive, from a source, a message to send to a target service;
determine a message identifier associated with the message;
determine, based upon the message identifier, whether the message is similar to a previous message that has previously been sent to the target service, wherein the previous message has previously been sent based upon receiving the previous message from the source, and wherein each of the message and the previous message has a format corresponding to a Web Services-Reliable Messaging (WS-RM) protocol;
retrieve, at the intermediary communication system, a delivery status identifier associated with the previous message, wherein the delivery status identifier indicates an status about a delivery of the previous message by the intermediary communication system, wherein the status is updated to indicate that the intermediary communication system received an acknowledgment of the previous message from the target service, the acknowledgment being sent by the target service to the intermediary communication system in response to the intermediary communication system sending the previous message to the target service;

determine whether the previous message has been delivered to the target service based upon a delivery status of the previous message, wherein the delivery status is determined based on the retrieved delivery status identifier;

upon determining that the previous message has been delivered to the target service, prevent the message from being sent to the target service; and upon determining that the previous message has not been delivered to the target service, perform one or more actions related to facilitating the message be sent to the target service.

9. The intermediary communication system of claim 8, wherein the one or more processors are configurable to:

determine whether the message identifier matches one of a plurality of identifiers stored in a data store, wherein each of the plurality of identifiers is associated with a different message that was received from the source and that was previously sent to the target service, and wherein determining that the message identifier matches a first identifier stored in the data store for the previous message indicates that the message is similar to the previous message that has previously been sent to the target service.

10. The intermediary communication system of claim 9, wherein the one or more processor processors are further configurable to:

determine a message sequence number of the message, wherein the message sequence number is based on a sequence of communication of the message using a communication protocol; and upon determining that the message identifier does not match one of the plurality of identifiers in the data store:

generate a new identifier to be associated with the message identifier, wherein the new identifier is generated based on the message sequence number and the message identifier of the message; and store the new identifier in the data store for the message.

11. The intermediary communication system of claim 8, wherein performing an action related to facilitating delivery of the message includes sending the message to the target service, and wherein the message is sent to the target service with information indicating a sequence number and the message identifier of the message.

12. The intermediary communication system of claim 8, wherein the one or more processor processors are further configurable to:

receive, via a delivery status interface, from an intermediary service system, information indicating that the previous message has been delivered to the target service;

store the information indicating that the previous message has been delivered to the target service, wherein the information is stored in associated with an identifier associated with the previous message; and send, to the source, information indicating that the previous message has been delivered to the target service.

13. The intermediary communication system of claim 8, wherein the one or more processors are further configurable to:

determine whether acknowledgement has been received from the target service for delivery of the previous message to the target service, wherein delivery of the previous message to the target service is determined based on whether the acknowledgement has been received; and upon determining that the previous message has not been delivered to the target service:

send the previous message to the target service.

14. A non-transitory computer-readable memory storing a set of instructions that, when executed by one or more processors, causes the one or more processors to:

receive, by a computing system of an intermediary communication system, from a source, a message to send to a target service;

determine a message identifier associated with the message;

determine, by the computing system, based upon the message identifier, that the message is similar to a previous message that has previously been sent to the target service, wherein the previous message has previously been sent based upon receiving the previous message from the source, and wherein each of the message and the previous message has a format corresponding to a Web Services-Reliable Messaging (WS-RM) protocol;

retrieve, at the intermediary communication system, a delivery status identifier associated with the previous message, wherein the delivery status identifier indicates an status about a delivery of the previous message by the intermediary communication system, wherein the status is updated to indicate that the intermediary communication system received an acknowledgment of the previous message from the target service, the acknowledgment being sent by the target service to the intermediary communication system in response to the intermediary communication system sending the previous message to the target service;

determine, by the computing system, whether the previous message has been delivered to the target service based upon a delivery status of the previous message, wherein the delivery status is determined based on the retrieved delivery status identifier;

upon determining that the previous message has been delivered to the target service, prevent delivery of the message to the target service; and upon determining that the previous message has not been delivered to the target service, perform, by the computing system, one or more actions related to facilitating delivery of the message to the target service.

15. The non-transitory computer-readable memory of claim 14, wherein the set of instructions, when executed by the one or more processors, further causes the one or more processors to:

determine whether acknowledgement has been received by the computing system from the target service for delivery of the previous message to the target service, wherein delivery of the previous message to the target service is determined based on whether the acknowledgement has been received; and upon determining that the previous message has not been delivered to the target service:

send the previous message to the target service.

16. The non-transitory computer-readable memory of claim 14, wherein the set of instructions, when executed by the one or more processors, further causes the one or more processors to:

determine whether the message identifier matches one of a plurality of identifiers stored in a data store, wherein each of the plurality of identifiers is associated with a different message that was received from the source and that was previously sent to the target service, and wherein determining that the message identifier matches a first identifier stored in the data store for the previous message indicates that the message is similar to the previous message that has previously been sent to the target service.

17. The non-transitory computer-readable memory of claim 14, wherein the set of instructions, when executed by the one or more processors, further causes the one or more processors to:

receive, via a delivery status interface, from an intermediary service system, information indicating that the previous message has been delivered to the target service;

store the information indicating that the previous message has been delivered to the target service, wherein the information is stored in association with an identifier associated with the previous message; and send, to the source, the information indicating that the previous message has been delivered to the target service.

18. The non-transitory computer-readable memory of claim 14, wherein performing an action related to facilitating delivery of the message includes sending the message to the target service, and wherein the message is sent with information indicating a sequence number and the message identifier of the message.

19. The non-transitory computer-readable memory of claim 16, wherein the set of instructions, when executed by the one or more processors, further causes the one or more processors to:

determine a message sequence number of the message, wherein the message sequence number is based on a sequence of communication of the message using a communication protocol; and upon determining that the message identifier does not match one of the plurality of identifiers in the data store:

generate new identifier to be associated with the message identifier, wherein the new identifier is generated based on the message sequence number and the message identifier of the message; and store the new identifier in the data store.

* * * * *

UNITED STATES PATENT AND TRADEMARK OFFICE
CERTIFICATE OF CORRECTION

PATENT NO. : 9,749,280 B2
APPLICATION NO. : 14/325834
DATED : August 29, 2017
INVENTOR(S) : Carr et al.

It is certified that error appears in the above-identified patent and that said Letters Patent is hereby corrected as shown below:

On the Title Page

Column 2, under Other Publications, Line 3, delete "-opert.org/" and insert -- -open.org/ --, therefor.

On page 2, Column 2, under Other Publications, Line 11, delete "orade.com/" and insert -- oracle.com/ --, therefor.

On page 2, Column 2, under Other Publications, Line 32, delete "llg" and insert -- 11g --, therefor.

On page 2, Column 2, under Other Publications, Line 34, delete "< http:" and insert -- <URL: http: --, therefor.

In the Specification

In Column 3, Line 36, delete "acknowledge" and insert -- acknowledgement --, therefor.

In Column 3, Line 63, delete "that that" and insert -- that --, therefor.

In Column 4, Line 52, delete "that that" and insert -- that --, therefor.

In Column 18, Line 31, after "after" delete "the".

In Column 21, Line 58, delete "the the" and insert -- the --, therefor.

In Column 35, Line 42, delete "electronically" and insert -- electrically --, therefor.

Signed and Sealed this
Twenty-sixth Day of June, 2018

Andrei Iancu
*Director of the United States Patent and Trademark Office*

CERTIFICATE OF CORRECTION (continued)
U.S. Pat. No. 9,749,280 B2

In the Claims

In Column 39, Line 32, in Claim 10, after "more" delete "processor".

In Column 39, Line 53, in Claim 12, after "more" delete "processor".